(12) United States Patent
Ogi et al.

(10) Patent No.: US 9,086,594 B2
(45) Date of Patent: Jul. 21, 2015

(54) LIGHTING DEVICE AND IMAGE DISPLAY DEVICE INCLUDING THE SAME

(71) Applicant: Hitachi Maxell, Ltd., Osaka (JP)

(72) Inventors: Yuya Ogi, Tokyo (JP); Satoshi Ouchi, Tokyo (JP); Seiji Murata, Tokyo (JP); Hidenao Kubota, Ibaraki (JP)

(73) Assignee: HITACHI MAXELL, LTD., Osaka (JP)

( * ) Notice: Subject to any disclaimer, the term of this patent is extended or adjusted under 35 U.S.C. 154(b) by 3 days.

(21) Appl. No.: 14/155,511

(22) Filed: Jan. 15, 2014

(65) Prior Publication Data

US 2014/0204307 A1    Jul. 24, 2014

(30) Foreign Application Priority Data

Jan. 21, 2013   (JP) .................................. 2013-007995

(51) Int. Cl.
*G02F 1/1335*   (2006.01)
*F21V 8/00*   (2006.01)

(52) U.S. Cl.
CPC .... *G02F 1/133605* (2013.01); *G02F 1/133604* (2013.01); *G02B 6/0031* (2013.01); *G02B 6/0055* (2013.01); *G02B 6/0096* (2013.01); *G02F 1/133603* (2013.01)

(58) Field of Classification Search
CPC ..................... G02F 1/133605; G02F 1/133604
See application file for complete search history.

(56) References Cited

FOREIGN PATENT DOCUMENTS

JP          2006-236701 A        9/2006

*Primary Examiner* — Phu Vu
(74) *Attorney, Agent, or Firm* — Baker Botts L.L.P.

(57) ABSTRACT

A lighting device according to the present invention includes: a curvedly shaped base chassis having a reflection layer on its inner surface; an optical sheet facing the reflection layer to output illuminating light of the lighting device; a light source group, disposed between the base chassis and the optical sheet, including first light sources and second light sources emitting light in mutually opposite directions; a light source substrate mounted with the light source group, and a light distribution adjusting member, covering the optical sheet side of the light source group, to direct light from the light source group into predetermined directions. The directions of light emission from the light source group are in parallel with the light output surface of the optical sheet. The reflection layer is curved such that a portion thereof on each of the two direction sides is concave away from the optical sheet.

21 Claims, 17 Drawing Sheets

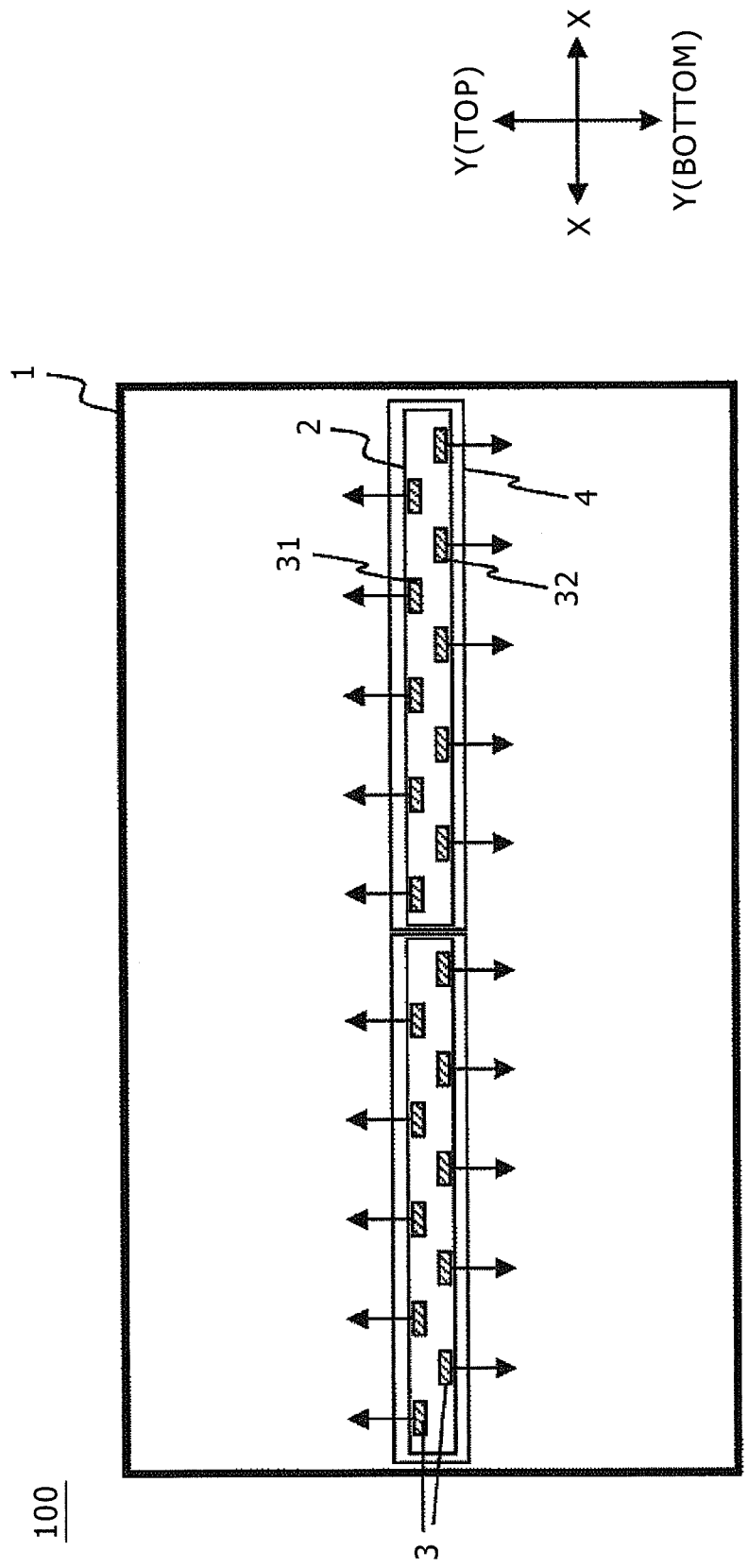

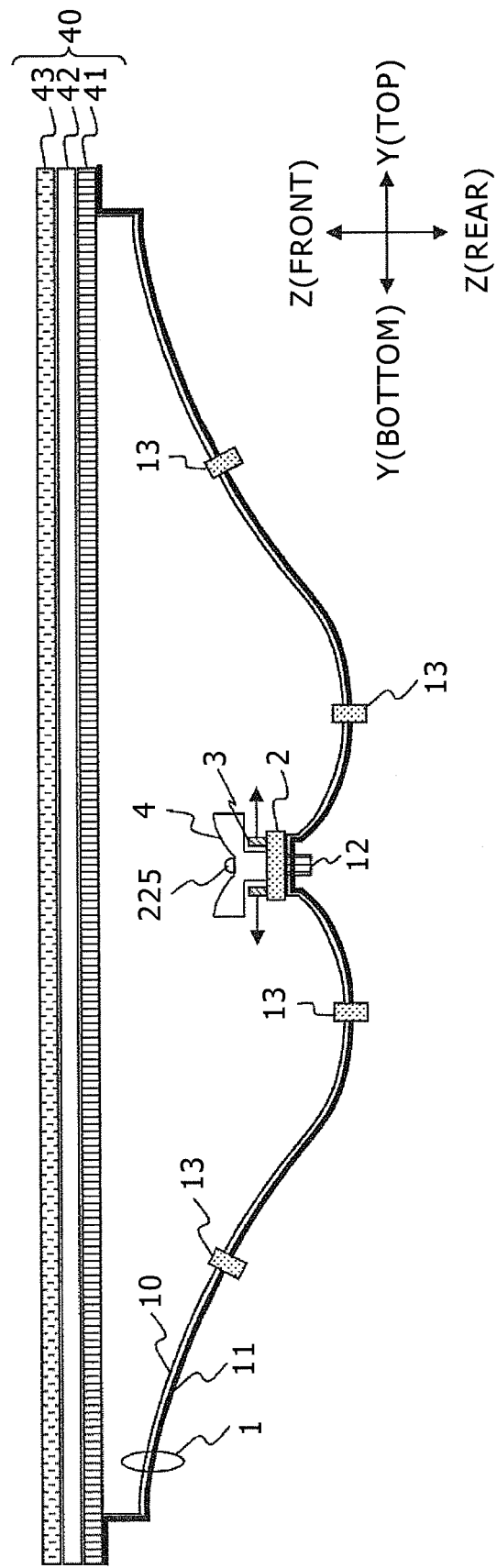

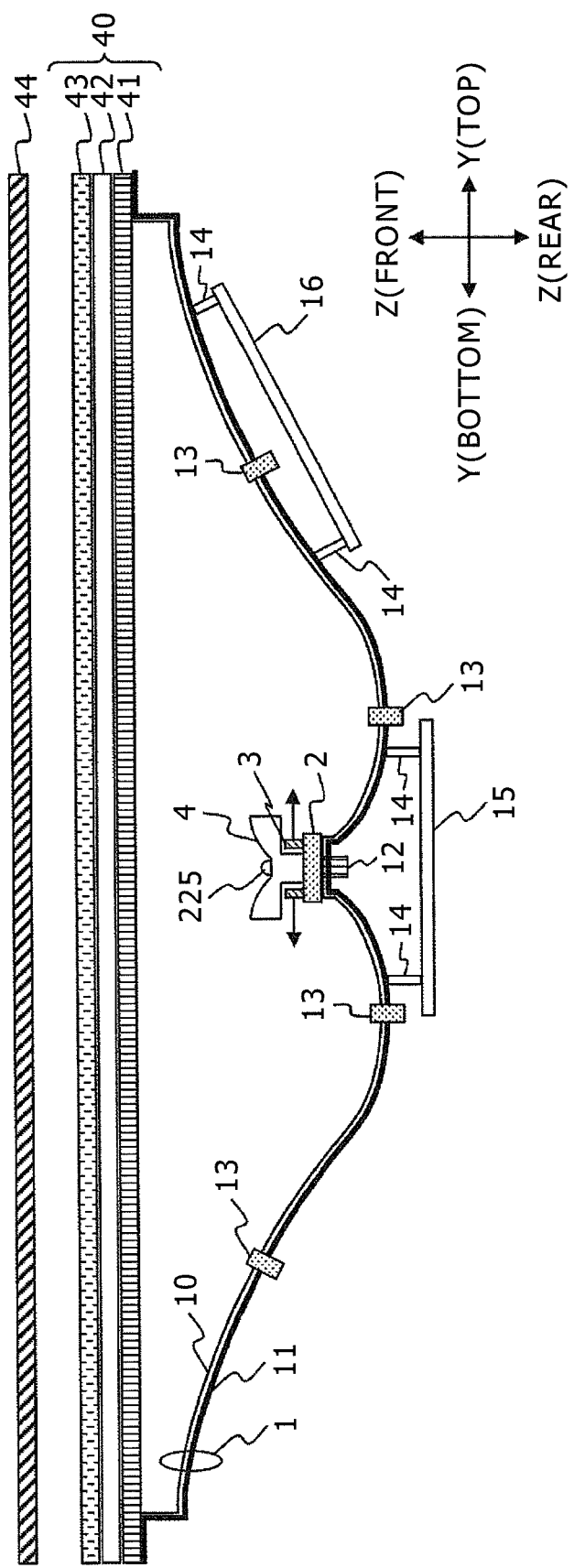

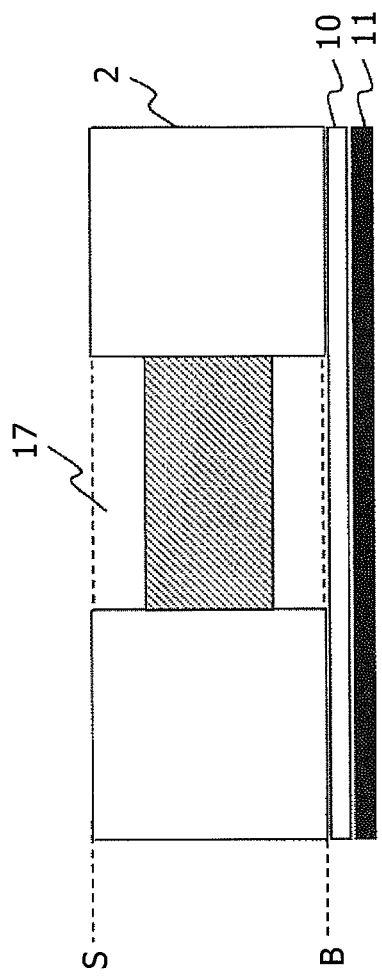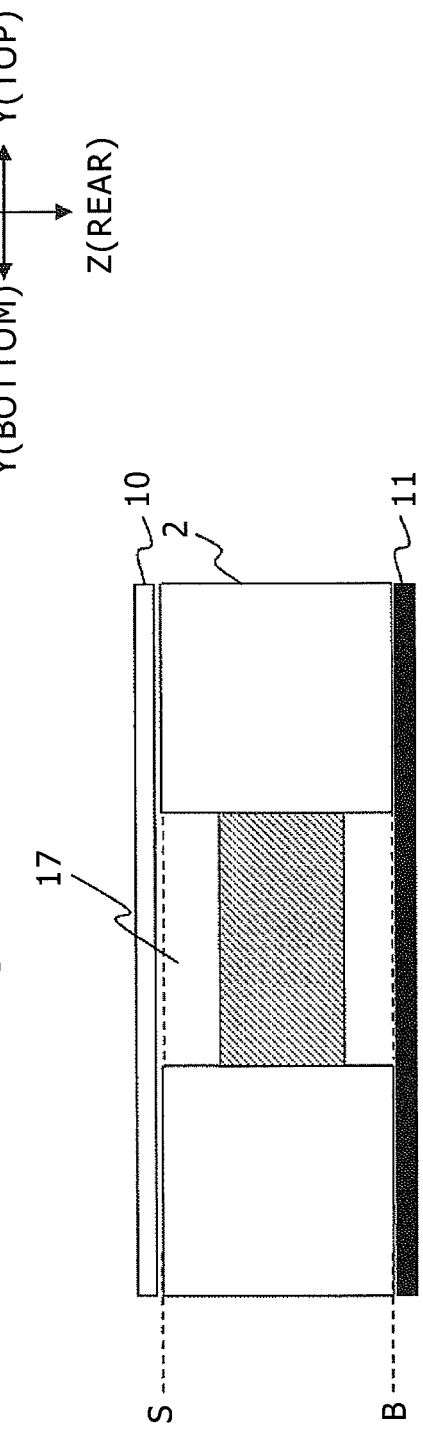

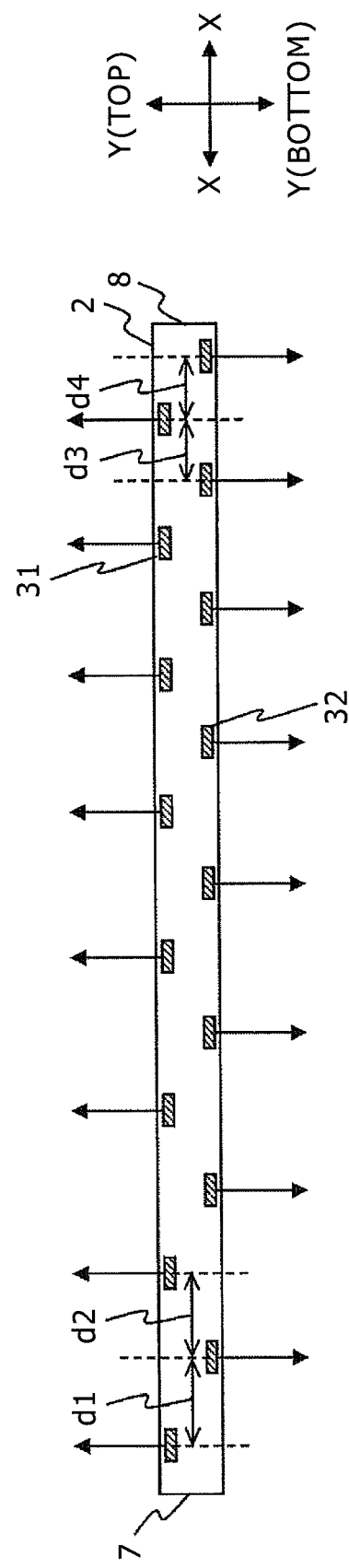

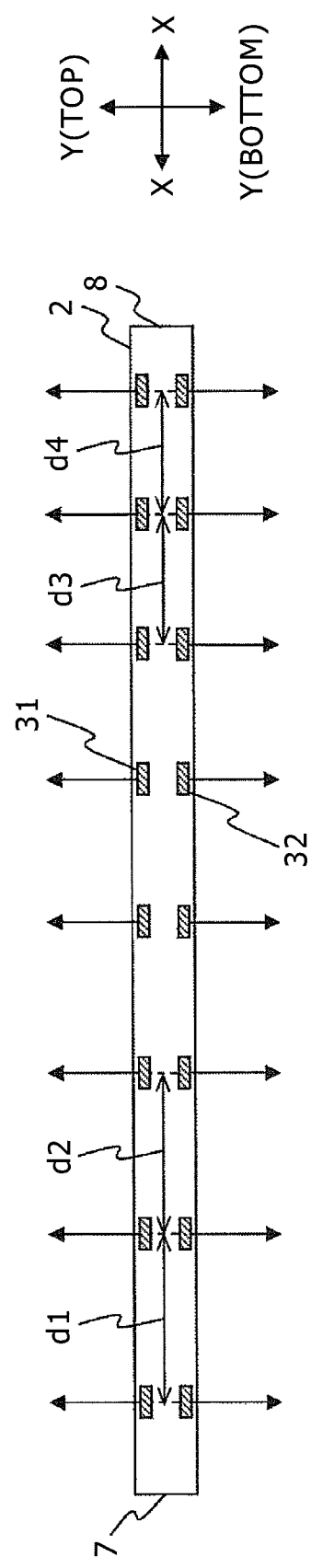

FIG. 8
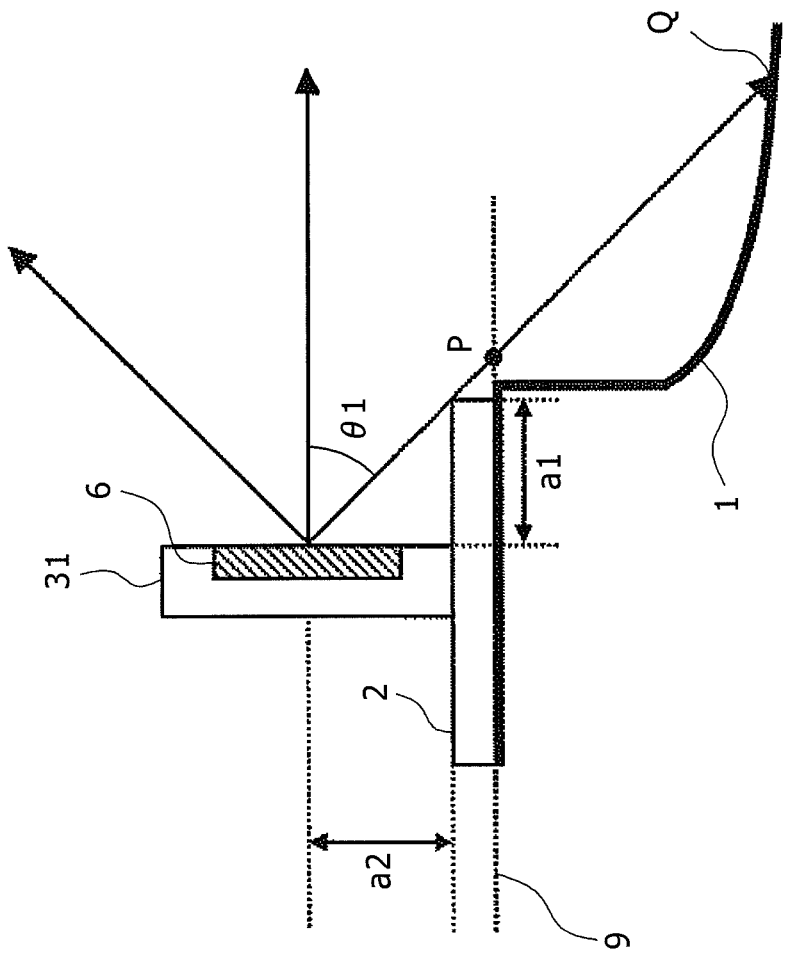
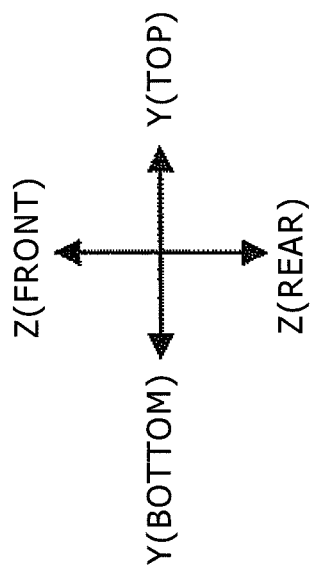

FIG.12
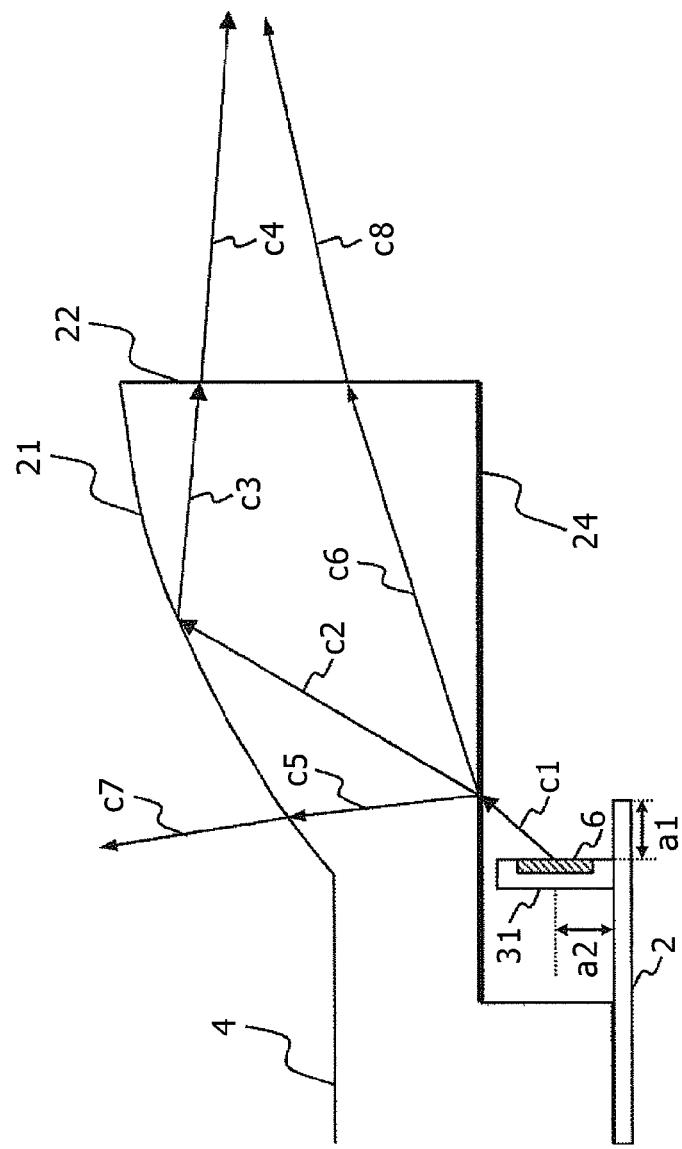
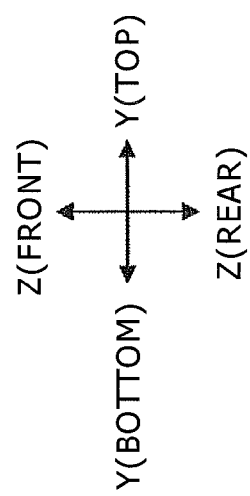

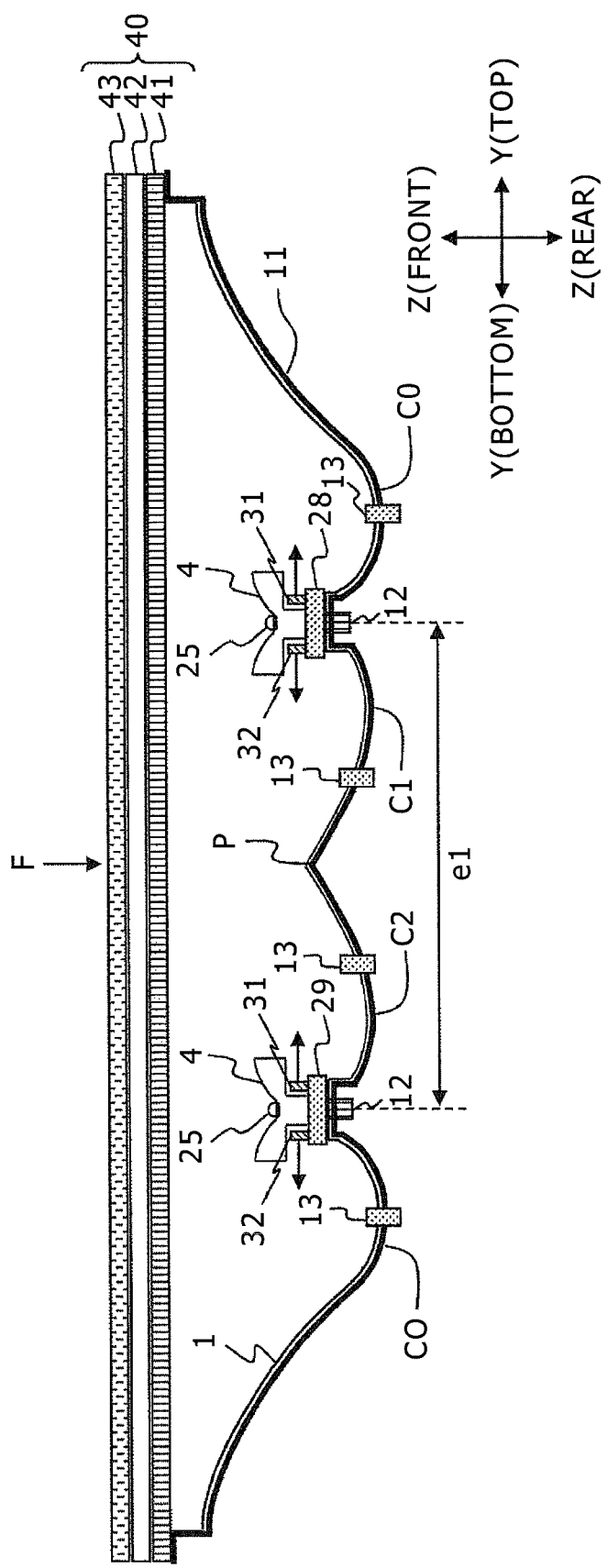

LIGHTING DEVICE AND IMAGE DISPLAY DEVICE INCLUDING THE SAME

CROSS-REFERENCE TO RELATED APPLICATION

This application claims the priority of Japanese Patent Application No. 2013-007995 filed Jan. 21, 2013, which is incorporated herein by reference in its entirety.

BACKGROUND

The present invention relates to a lighting device and an image display device including the same as a backlight.

Besides being used for general illumination purposes, for example, for indoor and outdoor lighting, lighting devices are also used as backlight devices for non-luminescent display devices such as liquid crystal display devices. Lighting devices for use as backlight devices, in particular, are required to be low power consuming and durable, so that they use, in many cases, LEDs (light emitting diodes) as light sources.

Lighting devices using LEDs as light sources, particularly, planar lighting devices each have a wide light emitting surface for illuminating a wide area. Such planar lighting devices each have an optical system for forming light emitted from the LEDs into a uniform planar light source. Known techniques for realizing such planar lighting devices include one disclosed in Japanese Unexamined Patent Application Publication No. 2006-236701. The backlight device described in the above patent document has a light guide plate including a groove-like concave portion on which side lighting LEDs are disposed and a diffuse reflection member provided on the underside of the light guide plate. The diffuse reflection member serves to uniformize brightness distribution so as to cause the liquid crystal panel of the planar lighting device to be uniformly irradiated with light.

SUMMARY

The technique disclosed in the above patent document requires using a light guide plate which is an expensive optical part to be as large in area as the liquid crystal panel, resulting in a cost increase. Also, according to the technique, so-called hot spots appear on the light guide plate as seen from the liquid crystal panel side, that is, brightness is higher in areas corresponding to the positions where the LEDs are disposed than in the rest of area. The generation of such hot spots is not given any consideration in the above patent document. Thus, the technique involves a concern that the spatial uniformity of light to illuminate the liquid crystal panel will be reduced (reduced brightness uniformity may hereinafter be referred to as "brightness unevenness."

The present invention has been made in view of the above problems, and an object of the present invention is to provide a low-cost lighting device with reduced brightness unevenness and an image display device including the lighting device as a backlight.

An aspect of the present invention features a structure as described in the appended claims. To be in more detail, a lighting device according to the present invention includes: a curvedly shaped base chassis having a reflection layer provided on an inner surface thereof; an optical sheet which is disposed to face the reflection layer of the base chassis and outputs illuminating light of the lighting device; a light source group which is disposed in a space between the base chassis and the optical sheet and includes a plurality of first light sources emitting light in a first direction and a plurality of second light sources emitting light in a second direction opposite to the first direction; a light source substrate on which the light source group is mounted and which is mounted on the base chassis; and a light distribution adjusting member which is disposed to cover an optical sheet side of the light source group and which directs light from the light source group into predetermined directions. In the lighting device, the first and second directions in which light is emitted from the light source group are, in a space between the base chassis and the optical sheet, in parallel with a light output surface of the optical sheet, the plurality of the first light sources are arranged in a direction perpendicular to the first direction, and the plurality of the second light sources are arranged in a direction perpendicular to the second direction. Also, in the lighting device, the reflection layer on the inner surface of the base chassis is curved such that a portion thereof on each of the first-direction side and the second-direction side relative to where the light source substrate is mounted is curved to concavely face the optical sheet.

The present invention can provide a low-cost lighting device with high spatial brightness uniformity and an image display device including the lighting device as a backlight.

BRIEF DESCRIPTION OF THE DRAWINGS

FIG. 1 is a schematic diagram of a planar lighting device according to an embodiment of the present invention, as seen on an X-Y plane;

FIG. 2 is a schematic diagram of a planar lighting device according to an embodiment of the present invention, as seen on a Y-Z plane;

FIG. 3 is a schematic diagram of an image display device according to an embodiment of the present invention, as seen on a Y-Z plane;

FIG. 4A is a diagram showing example relationships between a light source substrate, a reflection sheet, and a base chassis according to the present invention;

FIG. 4B is a diagram showing example relationships between a light source substrate, a reflection sheet, and a base chassis according to the present invention;

FIG. 5 is a schematic diagram showing a light source substrate and an arrangement of light sources on the light source substrate according to an embodiment of the present invention;

FIG. 6 is a schematic diagram showing a light source substrate and an arrangement of light sources on the light source substrate according to an embodiment of the present invention;

FIG. 8 is a schematic diagram of a light source substrate according to an embodiment of the present invention, as seen on a Y-Z plane;

FIG. 12 is a schematic diagram for explaining a light distribution adjusting member according to a second embodiment of the present invention;

FIG. 17 is a schematic diagram of a planar lighting device according to a sixth embodiment of the present invention, as seen on a Y-Z plane.

DETAILED DESCRIPTION

Figure 7:
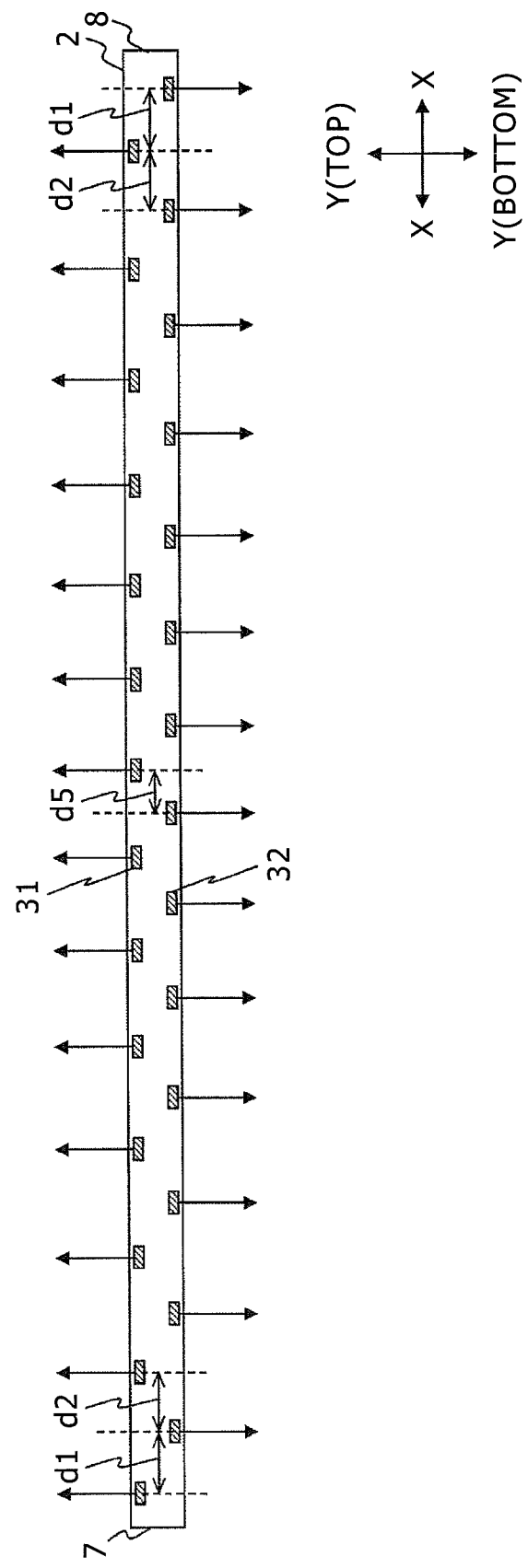
FIG. 7 is a schematic diagram showing a light source substrate and an arrangement of light sources on the light source substrate according to an embodiment of the present invention.

In the following, embodiments of the present invention will be described with reference to drawings. The following description of exemplary embodiments of the present invention does not limit the scope of the present invention. Those skilled in the art will be able to devise embodiments of the present invention by replacing some or all of the elements described in the following with equivalent elements. Such embodiments are also included in the scope of the present invention.

First Embodiment

First, overall structures of a lighting device and an image display device according to a first embodiment of the present invention will be described with reference to FIGS. 1 to 3. Subsequently, the structure of the present embodiment for eliminating brightness unevenness will be described. The lighting device being described in the following has a planar light output surface and outputs planar light. It will therefore be hereinafter referred to as a "planar lighting device." The light output surface (planar light output surface) of the planar lighting device of the present embodiment is rectangularly shaped. For the following description, the shorter-side direction of the light output surface, i.e. the vertical direction of the light output surface, is defined as "Y direction," the longer-side (longitudinal) direction of the light output surface, i.e. the horizontal direction of the light output surface, is defined as "X direction," and the depth direction of the light output surface (the direction perpendicular to the light output surface) is defined as "Z direction."

FIG. 1 is a schematic diagram of a planar lighting device according to an embodiment of the present invention as seen, on an X-Y plane, from the light output surface side of the device. FIG. 2 is a Y-Z plane sectional view of the planar lighting device and an image display device according to the present embodiment.

A planar lighting device 100 according to the present embodiment has, as shown in FIG. 1, a reflection layer 1 provided on an inner surface of a base chassis (details including shape being described later), a group of light sources 3 (hereinafter also referred to as the "light sources 3") emitting light both upward and downward in the Y direction, a light source substrate 2 on which the light sources 3 are mounted, and a light distribution adjusting member 4. The light sources 3 include both first light sources 31 to emit light upward in the Y direction (in a first direction) and second light sources 32 to emit light downward in the Y direction (in a second direction). In the following a single light source included in the light sources 3 may also be referred to as a "light source 3."

The first light sources 31 are arranged in the X direction, perpendicularly to their emission direction (the first direction). The second light sources 32 are also arranged in the X direction, perpendicularly to their emission direction (the second direction). Thus, the direction in which the light sources 3 emit light is, as shown by arrows in FIGS. 1 and 2, approximately parallel with the Y direction and also with the light output surface (planar light output surface) of the planar lighting device 100. Of the light sources 3, the first light sources 31 to emit light upward in the Y direction are disposed on the upper side in the Y direction of the light source substrate 2 and the second light sources 32 to emit light downward in the Y direction are disposed on the lower side in the Y direction of the light source substrate 2. In this way, the amount of light primary-reflected from end portions of the light source substrate 2 can be reduced as being described later.

Also, in the present embodiment, the first light sources 31 and the second light sources 32 are disposed along the X direction on the light source substrate 2 such that they are staggered not to overlap as seen in the Y direction. Furthermore, the light source substrate 2 is divided into two parts arranged along the X direction. It is, however, possible as being described later to use a single undivided light source substrate.

Each of the light sources 3 is a light emitting device, for example, a side view light emitting diode (LED) or a laser diode (LD). In the following description of the present embodiment, each light source 3 is assumed to be a side view LED to emit white light.

The planar lighting device 100 of the present embodiment has, as shown in FIG. 2, a base chassis 11 having a curved shape, a single or a group of optical sheets 40 disposed to face the base chassis 11 with each being a light transmitting sheet member, and the light distribution adjusting member 4 attached to the light source substrate 2 on which the light sources 3 are mounted. The light distribution adjusting member 4 makes adjustment to direct the light emitted from the light sources 3 into predetermined directions. The light distribution adjusting member 4 includes a light transmitting transparent resin as being described later. The light distribution adjusting member 4 is, at a middle portion thereof in the Y direction and at plural locations thereof along the X direction, screwed by screws 225 to the light source substrate 2. Alternatively, the light distribution adjusting member 4 may be attached to the light source substrate 2 using, for example, a double faced adhesive tape or an adhesive. When screwing the light distribution adjusting member 4 to the light source substrate 2 using the screws 25, the diameter of the screws 25 and the diameter of the corresponding screw holes formed in both the light source substrate 2 and the light distribution adjusting member 4 are desired to be as small as possible so as not to cause shorting between patterns formed on the light source substrate 2 to supply power to the light sources 3.

The light sources 3 mounted on the light source substrate 2 emit light, in the Y direction, into the space between the reflection layer 1 of the base chassis 11 and the optical sheet 40. Part of the light emitted from the light sources 3 is directed into the Y direction by the light distribution adjusting member 4 to be then reflected from the reflection layer 1 toward the optical sheet 40. Another part of the light emitted from the light sources 3 is directly reflected from the reflection layer 1 toward the optical sheet 40. Part of the light incident on the light distribution adjusting member 4 passes through the light distribution adjusting member 4 and reaches the optical sheet 40. The light reaching the optical sheet 40 is, by the diffusion effect of the optical sheet 40, uniformized and/or the brightness of the light is enhanced to be then outputted forward in the Z direction as illuminating light. Thus, the light output surface of the optical sheet 40 serves as the illuminating light output surface of the planar lighting device. Details of the above optical operation of the present embodiment will be described later.

In the present embodiment, the reflection layer 1 is made of, for example, a white resin reflection sheet 10. The reflection sheet 10 is attached to the curved inner surface of the base chassis 11. The base chassis 11 has, as shown in FIG. 2, a convex portion at a center thereof in the Y direction, projecting toward the optical sheet 40 and extending along the X direction. The most projecting part of the convex portion is flat with the light source substrate 2 disposed thereon. Each of the upper part above, in the Y direction, the flat part where the light source substrate 2 is mounted of the base chassis 11 and the lower part below, in the Y direction, the flat part where the light source substrate 2 is mounted of the base chassis 11 is curved to be, as shown in FIG. 2, concave as seen from the optical sheet 40 side (i.e. convex as seen from the rear side in the Z direction). The portion farthest from the optical sheet 40 of each of the upper and lower parts of the base chassis 11 is closer to the rear side (in the Z direction) of the planar lighting device 100 than the light source substrate 2 is.

The reflection sheet 10 is fixed at plural parts thereof to the base chassis 11, so as to be fitting the curved shape of the base chassis 11, using plural fixing parts 13 such as rivets or screws. Alternatively, the reflection sheet 10 may be fixed to the inner surface of the base chassis 11 using, for example, a double faced adhesive tape or an adhesive. Fixing the reflection sheet 10 to the inner surface of the base chassis 11 as described above causes the reflection layer 1, i.e. the reflection sheet 10, to be curvedly formed substantially matching the curved shape of the base chassis 11. In cases where, as described above, fixing parts 13 such as rivets are used to fix the base chassis 11 and the reflection sheet 10 together, at least one of the fixing parts 13 used to fix each of the upper and lower parts of the base chassis 11 is desired to be positioned farther in the Z direction from the light output surface of the optical sheet 40 than the light sources 3 are. Even though, in the present embodiment, the reflection layer 1 is composed of the reflection sheet 10 attached to the inner surface of the base chassis 11, the reflection layer 1 may alternatively be composed of white ink applied to the inner surface of the base chassis 11. Still alternatively, the reflection layer 1 may be formed by mirror-finishing the inner surface of the base chassis 11. The reflection sheet 10, white paint (ink) applied to the inner surface of the base chassis 11, or mirror-finished inner surface of the base chassis 11 to serve as the reflection layer 1 may have a diffuse reflection function for diffusely reflecting light.

The light source substrate 2 has connectors 12 provided on a surface thereof opposite to the surface thereof where the light sources 3 are mounted. The connectors 12 are connected to power lines (not shown) to supply power to the light sources 3. The connectors 12 are exposed to outside the base chassis 11 (to the rear side in the Z direction) through holes formed through the reflection layer 1 and the base chassis 11. The power lines are connected to the exposed connectors 12. The optical sheet 40 includes, for example, a diffusion sheet (plate) 41, a horizontal prism sheet 42, and a brightness enhancement film 43. Even though, in the present embodiment, the optical sheet 40 is composed of three sheets as described above, the optical sheet 40 may include a different number of different types of sheets, for example, optical sheets like vertical prism sheets.

FIG. 3 is a Y-Z plane sectional view of an image display device including the planar lighting device 100 according to the present embodiment. The image display device includes a liquid crystal panel 44 attached, using a panel holding member (not shown), to the light output side of the planar lighting device 100 (the light output side of the optical sheet 40) and a circuit substrate 15 or/and a circuit substrate 16 provided on the rear side of the base chassis 11. The circuit substrate 15 is attached, using structural members 14 for holding a circuit substrate, for example, bosses, to the base chassis 11 having curved surfaces such that the circuit substrate 15 is positioned more toward, in the Z direction, the rear side of the image display device than any part of the curved base chassis 11. The structural members 14 for holding a circuit substrate may each have a screw hole formed through a central portion thereof or they may be holding parts such as rivets.

By positioning, as shown in FIG. 3, the circuit substrate 15 approximately at a center, in the Y direction, of the image display device, i.e. to be approximately in the same position in the Y direction as the light source substrate 2, both end portions in the Y direction of the image display device can be made thinner than the other portions thereof. Also as shown in FIG. 3, attaching the circuit substrate 16 to the upper part of the curved base chassis 11 such that the circuit substrate 16 is positioned above, in the Y direction, the portion farthest from the optical sheet 40 of the upper part of the curved base chassis 11 makes it possible to reduce the depth (dimension in the Z direction) of the image display device. It is to allow the heat generated by the circuit substrate 16 to be released more easily that the circuit substrate 16 is attached to the upper part of the base chassis 11. It is desirable that a circuit substrate which generates a large amount of heat, a power supply substrate in particular, be attached to the upper part of the base chassis 11. It may, therefore, be appropriate to form, for example, signal processing circuits for processing video signals and driver circuits for driving the light sources 3 on the circuit substrate 15 and to form power supply circuits which generate a large amount of heat on the circuit substrate 16.

However, the present invention is not limited to the above circuit substrate arrangement. For example, without disposing the circuit substrate 15, plural circuit substrates 16 provided with signal processing circuits, driver circuits, and power supply circuits may be attached to the upper part of the base chassis 11 such that the plural circuit substrates 16 are positioned, in the Y direction, above the portion farthest from the optical sheet 40 of the upper part of the base chassis 11. Alternatively, a circuit substrate provided with signal processing circuits and driver circuits may be attached to the lower part of the base chassis 11 such that the circuit substrate is positioned, in the Y direction, below the portion farthest from the optical sheet 40 of the lower part of the curved base chassis 11 whereas the circuit substrate 16 provided with power supply circuits is attached to the upper part of the base chassis 11 such that the circuit substrate 16 is positioned above, in the Y direction, the portion farthest from the optical sheet 40 of the upper part of the curved base chassis 11.

Next, the physical positional relationship between the light source substrate 2 and the reflection sheet 10 will be described with reference to FIGS. 4A and 4B. FIGS. 4A and 4B are each a Y-Z plane sectional view of the light source substrate 2 taken through the center of a through-hole 17 formed through the light source substrate 2. Note that, in FIGS. 4A and 4B, the light sources are omitted. Through-holes 17 are preferably formed through the light source substrate 2 to be near light sources 3 so as to promote releasing of the heat generated by the light sources 3. Forming a conductive surface portion (area hatched in each of FIGS. 4A and 4B) with high heat release efficiency on the inner surface of each through-hole 17 such that the conductive surface portion is spaced from both the light source mounted side (top surface S) and the bottom surface B of the light source substrate 2 makes it unnecessary to consider providing metallic contact between the through-hole 17 and each of the surfaces S and B. Also, providing the non-conductive reflection sheet 10 to be in contact with the bottom surface B as shown in FIG. 4A enhances the electrical insulation between the light source substrate 2 and the base chassis 11. When the reflection sheet 10 is disposed, as shown in FIG. 4B, on the light source substrate 2, the light source substrate 2 comes in contact with the base chassis 11 that is generally higher in heat conductivity than the reflection sheet 10, so that the heat generated by the light source substrate 2 can be efficiently released. In this case, a heat conductive sheet or an electrically insulating sheet may be placed between the light source substrate 2 and the base chassis 11.

Though in the examples shown in FIGS. 4A and 4B, the reflection sheet 10 is provided to be in contact with either the top surface S or bottom surface B of the light source substrate 2, the reflection sheet 10 need not necessarily be placed as described above as long as the reflection sheet 10 extends to near the end portion on each side of the light source substrate 2. In cases where the reflection sheet 10 is not placed as described above or where, as shown in FIG. 4A, the top surface S is covered with no reflection sheet, the surface S may be painted white for higher reflection efficiency at the light source substrate 2.

Next, example arrangements of the light sources 3 mounted on the light source substrate 2 will be described with reference to FIGS. 5 to 7. Each of FIGS. 5 and 6 shows a light source substrate 2 to be combined with another one of the same type for inclusion in a planar lighting device. FIG. 7 shows a light source substrate 2 to be included in a planar lighting device as it is alone.

In FIG. 5, an example arrangement of light sources 3 mounted on a light source substrate 2 is represented. In the example shown in FIG. 5, the light sources 3 mounted on the light source substrate 2 are composed of plural first light sources 31 emitting light upward in the Y direction (in the first direction) and plural second light sources 32 emitting light downward in the Y direction (in the second direction). The first light sources 31 and the second light sources 32 are alternately arranged along the X direction such that each of the first light sources 31/second light sources 32 is spaced from the adjacent second light sources 32/first light sources 31 by predetermined distances in the y direction (for example, ranging from several millimeters to several centimeters). Namely, the first light sources 31 and the second light sources 32 are alternately staggeredly arranged along the X direction. In this arrangement, the first light sources 31 emit light upward in the Y direction and the second light sources 32 adjacent to the first light sources 31, respectively emit light downward in the Y direction. In the example shown in FIG. 5, the distance between light sources 3 (the distance between an adjacent pair of first light source 31 and second light source 32) is gradually smaller in the direction from a first substrate-end portion 7 toward a second substrate-end portion 8 of the light source substrate 2. The first substrate-end portion 7 is on an end side in the X direction of the light output surface of the planar lighting device 100. The second substrate-end portion 8 corresponds to a central portion in the X direction of the planar lighting device 100.

When using the light source substrate 2 of the type shown in FIG. 5 in the planar lighting device 100, it is necessary to arrange the light source substrate 2 shown in FIG. 5 and another light source substrate 2 of the same type side by side along the X direction with the another light source substrate 2 turned left-side right so that the second substrate-end portions 8 of the two light source substrates 2 are adjacent to each other. By doing this, the distance between the light sources 3 at around the center in the X direction of the planar lighting device can be shortened. In this way, compared with cases in which the distance between adjacent light sources 3 is uniform, the brightness of the planar lighting device can be made higher around a central portion thereof than in peripheral portions thereof. This makes it possible, particularly, when applying the planar lighting device 100 to an image display device, to form a brightness gradient causing the display of the image display device to be brightest at around the central portion thereof.

The distance between light sources 3 along the X direction will be described below. To form a gentle brightness gradient on the light output surface of the planar lighting device 100, it is desirable to gradually change the distance between light sources 3 along the X direction without making the ratio between the largest distance and the smallest distance smaller than 0.6. When the ratio between the largest distance and the smallest distance is smaller than 0.6, the brightness gradient is too steep and varying brightness tends to be recognized as uneven brightness. In the example shown in FIG. 5, therefore, the light sources 3 are arranged along the X direction such that distances d1 and d2 between the three light sources near the first substrate-end portion 7 and distances d3 and d4 between the three light sources near the second substrate-end portion 8 (i.e. near the central portion in the X direction of the light output surface of the planar lighting device 100) are related as represented by the following expression (1).

$$\text{MIN}(d3,d4)/\text{MAX}(d1,d2) \geq 0.6 \tag{1}$$

where MIN is a minimum value and MAX is a maximum value. Arranging the light sources 3 as described above makes it possible to realize a planar lighting device having a gentle brightness gradient with the brightness of the planar lighting device higher around a central portion thereof than in peripheral portions thereof. As for the relationships between d1 and d2 and between d3 and d4, they may be either equal to each other (d1=d2 and d3=d4) or d1 may be larger than d2 (d1>d2) and d3 may be larger than d4 (d3>d4).

In FIG. 6, another example arrangement of light sources 3 mounted on a light source substrate 2 is represented. In the example shown in FIG. 6, the light sources 3 mounted on the light source substrate 2 are composed of plural first light sources 31 emitting light upward in the Y direction (in the first direction) and plural second light sources 32 emitting light downward in the Y direction (in the second direction). The first light sources 31 and the second light sources 32 are mutually identically arranged along the X direction. In this arrangement, there are predetermined distances in the y direction (for example, ranging from several millimeters to several centimeters) between each of the first light sources 31/second light sources 32 and the adjacent first light sources 31/second light sources 32.

When using the light source substrate 2 of the type shown in FIG. 6 in the planar lighting device 100, it is necessary to arrange the light source substrate 2 shown in FIG. 6 and another light source substrate 2 of the same type side by side along the X direction with the another light source substrate 2 turned left-side right so that the second substrate-end portions 8 of the two light source substrates 2 are adjacent to each other. By doing this, the distance between the light sources 3 at around the center in the X direction of the planar lighting device can be shortened. In this way, compared with cases in which the distance between adjacent light sources 3 is uniform, the brightness of the planar lighting device can be made higher around a central portion thereof than in peripheral portions thereof. This makes it possible, particularly, when applying the planar lighting device 100 to an image display device, to form a brightness gradient causing the display of the image display device to be brightest at around the central portion thereof.

In the example shown in FIG. 6, too, it is desirable to gradually change the distance between light sources 3 along the X direction without making the ratio between the largest distance and the smallest distance smaller than 0.6. Therefore, in the example shown in FIG. 6, too, the light sources 3 are arranged along the X direction such that distances d1 and d2 between the three pairs of correspondingly positioned light sources near the first substrate-end portion 7 and distances d3 and d4 between the three pairs of correspondingly positioned light sources near the second substrate-end portion 8 (i.e. near the central portion in the X direction of the light output surface of the planar lighting device 100) are related as represented by the above expression (1).

Arranging the light sources 3 as described above makes it possible to realize a planar lighting device having a gentle brightness gradient with the brightness of the planar lighting device higher around a central portion thereof than in peripheral portions thereof. As for the relationships between d1 and d2 and between d3 and d4, as in the case shown in FIG. 5, they may be either equal to each other (d1=d2 and d3=d4) or d1 may be larger than d2 (d1>d2) and d3 may be larger than d4 (d3>d4).

In FIG. 7, still another example arrangement of light sources 3 mounted on a light source substrate 2 is represented. In the example shown in FIG. 7 as in the example shown in FIG. 5, the light sources 3 mounted on the light source substrate 2 are composed of plural first light sources 31 emitting light upward in the Y direction (in the first direction) and plural second light sources 32 emitting light downward in the Y direction (in the second direction). The first light sources 31 and the second light sources 32 are alternately arranged along the X direction such that each of the first light sources 31/second light sources 32 is spaced from the adjacent second light sources 32/first light sources 31 by a predetermined distances in the y direction (for example, ranging from several millimeters to several centimeters). Namely, the first light sources 31 and the second light sources 32 are alternately staggeredly arranged along the X direction. In this arrangement, the first light sources 31 emit light upward in the Y direction and the second light sources 32 adjacent to the first light sources 31, respectively emit light downward in the Y direction.

As mentioned in the foregoing, the example shown in FIG. 7 differs from the example shown in FIG. 5 in that, whereas, for inclusion in a planar lighting device, the light source substrate 2 shown in FIG. 5 requires to be combined with another one of the same type, the light source substrate 2 shown in FIG. 7 can be included as it is alone in a planar lighting device. Namely, referring to FIG. 7, the first substrate-end portion 7 is on the left end side in the X direction of the light output surface of the planar lighting device 100 and the second substrate-end portion 8 is on the right end side in the X direction of the light output surface of the planar lighting device 100. The two light sources spaced apart by distance d5 as shown in FIG. 7 are positioned to be around a central portion in the X direction of the light output surface of the planar lighting device 100.

In the example shown in FIG. 7, too, it is desirable that the distance between light sources 3 is gradually smaller in the direction from the first substrate-end portion 7/the second substrate-end portion 8 toward around a central portion in the X direction of the light source substrate 2 and that the ratio between the largest distance and the smallest distance is 0.6 or larger. Namely, in the example shown in FIG. 7, distances d1 and d2 between the three light sources near the first substrate-end portion 7 and between the three light sources near the second substrate-end portion 8 and distance d5 between the two light sources around the center in the X direction of the light source substrate 2 are related as represented by the following expression (2).

$$d5/\mathrm{MAX}(d1,d2) \geq 0.6 \qquad (2)$$

where MIN is a minimum value and MAX is a maximum value. Arranging the light sources 3 as described above makes it possible to realize a planar lighting device using the single light source substrate 2 and having a gentle brightness gradient with the brightness of the planar lighting device higher around a central portion thereof than in peripheral portions thereof. As for the relationships between d1 and d2, they may be equal to each other (d1=d2) or d1 may be larger than d2 (d1>d2).

Next, with reference to FIG. 8, positional relationships between the light source substrate 2, light sources 3, and reflection layer 1 and the amount of primary-reflected light from end portions of the light source substrate 2 will be described. FIG. 8 is a Y-Z plane sectional view showing, for descriptive simplification, only a light source 3 emitting light upward, in the Y direction, of the light source substrate 2 (i.e. only a first light source 31) and an upper portion in the Y direction of the reflection layer 1. Also in FIG. 8, the light distribution adjusting member 4 is omitted. The light source 3 (the first light source 31 in this case) has a light emitting surface 6 which emits Lambertian-distributed light. Namely, relative to the intensity (I) of light emitted perpendicularly from the light emitting surface 6, the intensity of light emitted at angle θ1 is represented as I×cos(θ1). For the following description, angle θ1 is defined as the angle of the marginal light, out of the light emitted from the light emitting surface 6, not reflected from or absorbed into the light source substrate 2.

Referring to FIG. 8, the light emitted at a larger angle than θ1 relative to the light emitted perpendicularly from the light emitting surface 6 is reflected from (primary reflection) or is absorbed into the light source substrate 2. Since the distance between the light emitting surface 6 and the light source substrate 2 is very small, the area irradiated with light from the light emitting surface 6 is very small. This causes a small bright spot, i.e. a so-called hot spot, which can be seen from the light output surface side of the planar lighting device 100 to be formed near, in the Y direction, the light emitting surface 6 of the first light source 31 by the primary-reflected light. The hot spot being very bright compared with the area around it generates a steep brightness gradient to cause brightness unevenness.

In the present embodiment, the relationship between distance a1, in the Y direction, between the light emitting surface 6 of the first light source 31 and the upper end in the Y direction of the light source substrate 2 and distance a2, in the Z direction, between the upper surface (the light source mounted surface) of the light source substrate 2 and the center in the Z direction of the light emitting surface 6 is optimized so as to reduce the amount of the primary-reflected light and so as to thereby suppress the generation of brightness unevenness.

When, for example, a1=a2, then θ1=45°. In this case, the light flux ratio E2/E1 is about 0.40, where E1 is the amount of light flux at an angle range of 0° to θ1 and E2 is the amount of light flux at an angle range of θ1 to 90°. When, for example, a1=(a2/2), then θ1=63.5°. In this case, the light flux ratio E2/E1 is about 0.12. Namely, when the value of a1 is smaller, the amount of primary-reflected light from the light source substrate 2 is smaller and the amount of light absorbed into the light source substrate 2 can be reduced. However, reducing the value of a1 to almost 0 requires the first light source 31 to be positioned at the upper edge, in the Y direction, of the light source substrate 2. This adversely affects the heat release performance of the light source substrate 2 and the light source mountability. Thus, reducing the amount of primary-reflected light and improving the heat release performance and the light source mountability are in a trade-off relationship.

In the present embodiment, to improve the heat release performance of the light source substrate 2 and the light source mountability while reducing the amount of primary-reflected light from the light source substrate 2, the values of a1 and a2 are selected such that θ1 is not smaller than 30° (θ1≥30°). Namely, in the present embodiment, the angle θ1 formed between the line connecting the center of the light emitting surface 6 of the first light source 31 and the upper end in the Y direction of the light source mounted surface of the light source substrate 2 and the line perpendicularly extended from the center of the light emitting surface 6 of the first light source 31 is 30° or larger. When θ1=30°, the light flux ratio E2/E1 is about 0.95 and, in this state, the amount of light flux E1 reflected from or absorbed into the light source substrate 2 approximately equals the amount of light flux E2 not incident on the light source substrate 2. When, on the other hand, θ1<30°, the proportion of the amount of primary-reflected light to the total amount of light flux at an angle range of 0° to 90° equals or exceeds 1. This greatly enhances the intensity of the hot spot formed near, in the Y direction, the first light source 31 by the primary-reflected light and generates a steep brightness gradient to cause brightness unevenness.

Even though the above description made with reference to FIG. 8 concerns the upper portion in the Y direction of the light source substrate 2, the same also applies to the lower portion in the Y direction of the light source substrate 2.

Next, the relationship between the light emitted at angle θ1 from the light emitting surface 6 and the reflection layer 1 will be described. The portion near the first light source 31 of the reflection layer 1 is positioned more toward the rear side in the Z direction than a bottom surface 9 of the light source substrate 2. If the reflection layer 1 is formed to extend linearly along the bottom surface 9 of the light source substrate 2, the light emitted at angle θ1 from the light emitting surface 6 is reflected at point P shown in FIG. 8. However, since the reflection layer 1 is formed such that, as shown in FIG. 8, the end portion on the light emission side (upper side in the Y direction) of the flat part where the light source substrate 2 is mounted of the reflection layer 1 is positioned to be lower in the Y direction than point P, the light emitted at angle θ1 from the light emitting surface 6 is reflected at position Q on the reflection layer 1 where the reflection layer 1 is curved. Namely, the light emitted at angle θ1 from the light emitting surface 6 is reflected at a position farther away from the first light source 31 than point P. Forming the reflection layer 1 as described above also increases the area on the reflection layer 1 irradiated with the light emitted from the light emitting surface 6 making it possible to control the angle of reflected light by means of the shape of the reflection layer 1. This makes it possible to realize a flat lighting device having a gentle brightness gradient.

Figure 9:
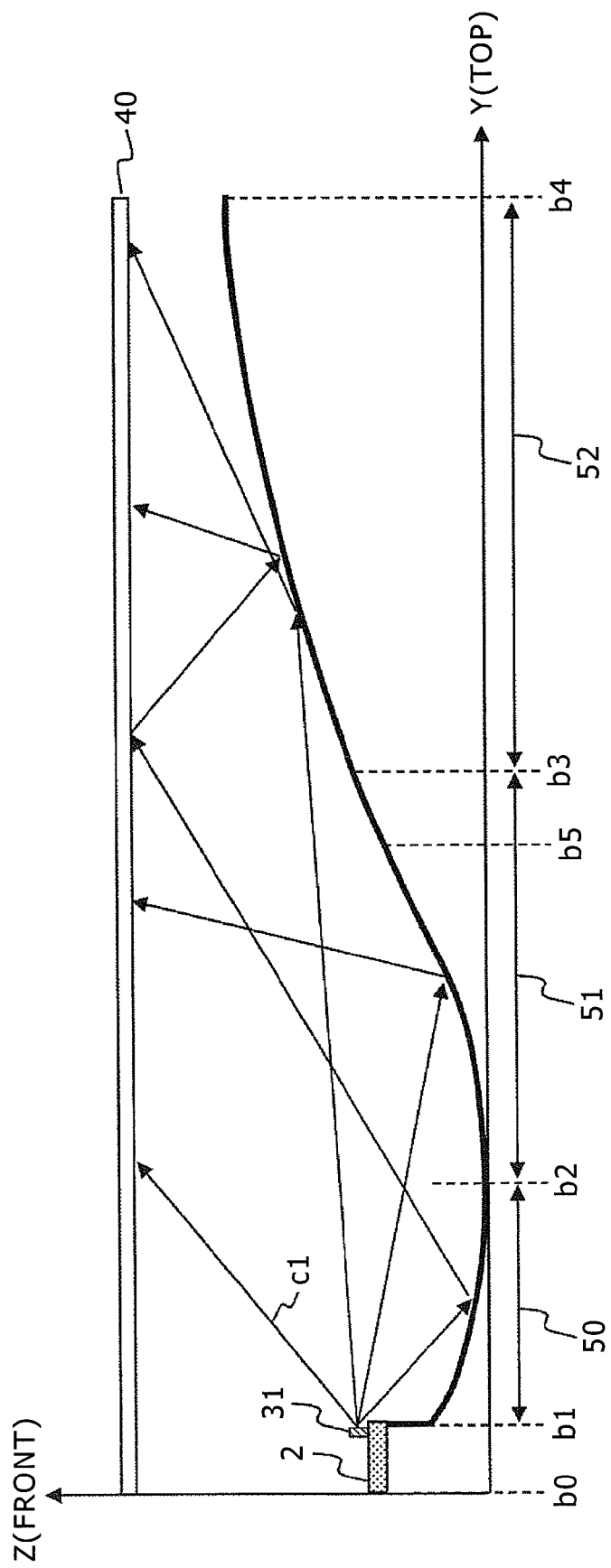
FIG. 9 is a schematic diagram of a reflection layer according to the present invention.

Next, with reference to FIG. 9, the shape of the reflection layer 1 will be described. In FIG. 9, for descriptive simplification, only a portion on a Y-Z plane above the center, in the Y direction, of the planar lighting device 100 is shown and the light distribution adjusting member 4 is omitted.

As shown in FIG. 9, the sectional shape of the reflection layer is curved except where the light source substrate 2 is mounted. Namely, the reflection layer 1 is curved such that, between an upper end portion b1, in the Y direction, of the flat part (positioned closely to the light sources 3) where the light source substrate 2 is mounted and a center position b5 in the Y direction of the upper half portion of the reflection layer 1, there is an apex b2 (the portion farthest from the optical sheet 40) of the curved portion which is concave as seen from the front side in the Z direction (as seen from the optical sheet 40 side) and such that, between the apex b2 and an upper end portion b4 in the Y direction, there is an inflection point b3. The apex b2 is positioned more toward the rear side in the Z direction of the planar lighting device 100. At the inflection point b3, the gradient change rate (d2Z/dY2) of the curve is zero (0). The curved shape like this can be approximated, for example, by combining cubic curves or arcs. The reflection layer 1 may be curved such that it has plural apexes b2 and inflection points b3. In such a case, the curve can be approximated, for example, by connecting cubic curves and arcs.

Also, with reference to FIG. 9, the manner of light reflection from the reflection layer 1 that is curved according to the present embodiment will be described below. The light emitted from the first light source 31 and reflected from an area 50 extending from the end portion b1 to the apex b2 becomes denser in the space farther in the Y direction (above the apex b2 in the Y direction). Namely, brightness is suppressed near the end portion b1 and is enhanced in space above, in the Y direction, the apex b2. The light reflected from an area 51 between the apex b2 and the inflection point b3 is directed toward the opposing optical sheet 40 side, so that the brightness in a central portion in the Y direction of the optical sheet 40 is maintained. The light reflected from an area 52 between the inflection point b3 and the upper end portion b4 is diffused toward the end side in the Y direction of the optical sheet 40 to increase the brightness at the end portion of the optical sheet 40. Thus, the light reflected from the areas 50, 51, and 52 overlappingly reaches the optical sheet 40. As a result, the portion ranging from around the first light source 31 to the upper end portion in the Y direction of the optical sheet 40 is more uniformly irradiated with light. Even though the above description made with reference to FIG. 9 concerns only the upper portion in the Y direction of the planar lighting device 100, the above description of optical operation also applies to the lower portion in the Y direction of the planar lighting device 100.

With the reflection layer 1 shaped as described above, most of the light emitted from the first light source 31 is propagated upward in the Y direction by being reflected or diffused from the reflection layer 1. Part of the light emitted from the first light source 31 (for example, a light ray c1 denoted in FIG. 9), however, directly reaches, as direct incident light, the optical sheet 40 without being reflected or diffused from the reflection layer 1. Since the direct incident light has been neither reflected nor diffused from the reflection layer 1, it generates uneven brightness near, in the Y direction, the first light source 31 which can be observed from the light output surface side of the planar lighting device.

Figure 10:
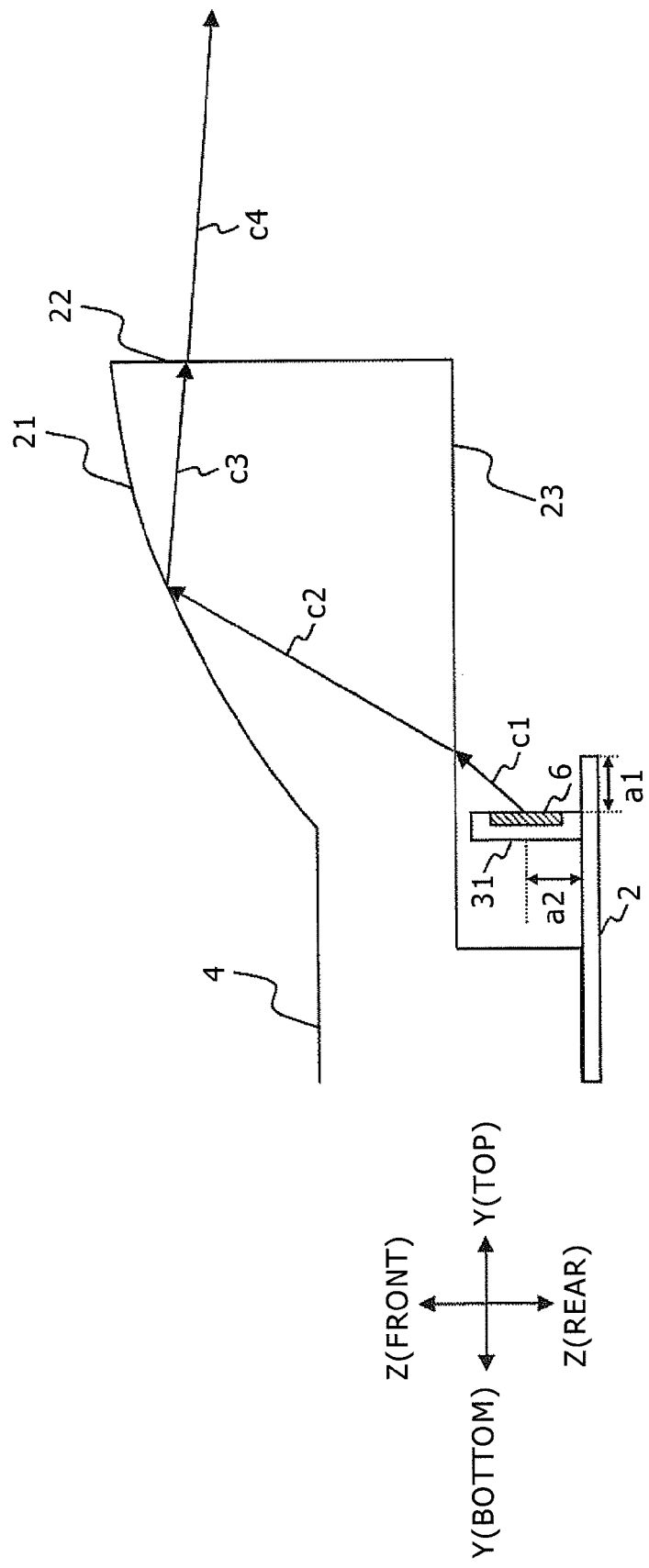
FIG. 10 is a schematic diagram of a light distribution adjusting member according to a first embodiment of the present embodiment.

Next, with reference to FIG. 10, the shape and functions of the light distribution adjusting member 4 for inhibiting the generation of brightness unevenness by the direct incident light will be described. FIG. 10 shows the positional relationship on a Y-Z plane between the first light source 31 emitting light upward, in the Y direction, of the light source substrate 2 and the light distribution adjusting member 4 positioned upward, in the Y direction, of the first light source 31 and a light ray path inside the light distribution adjusting member 4.

The light distribution adjusting member 4 has a first surface 21 which is a curved surface formed forward, in the Z direction, of the first light source 31 (i.e. on the optical sheet 40 side), a second surface 22 which is positioned above, in the Y direction, the light emitting surface 6 of the first light source 31 to be approximately in parallel with the light emitting surface 6, and a third surface 23 which is positioned forward, in the Z direction, of the light sources 3 (i.e. on the optical sheet 40 side) to be closer to the light sources 31 than the first surface 21 and which faces the top surface of the light source substrate 2 while being approximately perpendicular to the light emitting surface 6. The light distribution adjusting member 4 is made of, for example, transparent resin such as polycarbonate resin or acrylic resin. The first surface 21 is curved, as shown in FIG. 10, to be convex as seen from the front side in the Z direction (i.e. the optical sheet 40 side). The second surface 22 is connected to the first surface 21 and the third surface 23. As described above, the light distribution adjusting member 4 of the present embodiment is shaped to project beyond the light emitting surface 6 of the light source (the first light source 31 in the present example) in the direction of light emission, i.e. upward in the Y direction, and to cover a front portion in the Z direction (i.e. a portion on the optical sheet 40 side) of the first light source 31. Each of the first surface 21, second surface 22, and third surface 23 is a mirror-finished transmitting surface.

Referring to FIG. 10, a light ray c1 emitted from the light emitting surface 6 is refracted at the third surface 23 of the light distribution adjusting member 4 to then travel as a light ray c2. The light ray c2 travels inside the light distribution adjusting member 4 and reaches the first surface 21. With the first surface 21 being a surface separating air from the light distribution adjusting member 4, the light ray c2 having reached the first surface 21 tends to advance into the air layer with a refraction index smaller than that of the light distribution adjusting member 4. However, shaping the first surface 21 so as to cause the light refracted at the third surface 23 to be totally reflected at the first surface makes it possible to direct the light upward in the Y direction as shown in FIG. 10. Thus, the light ray c2 totally reflected at the first surface 21 then travels, as a light ray c3, to be then slightly refracted at the second surface 22 and further travels, as a light ray c4, into the space between the reflection layer 1 and the optical sheet 40. This makes the second surface 22 of the light distribution adjusting member 4 a pseudo-light emitting surface.

As described above, the light distribution adjusting member 4 has an optical function to direct the light from the light sources 3 into a predetermined direction (upward in the Y direction in the present example). Though it is difficult for the first light source 31 mounted on the light source substrate 2 in the present example to adjust or control the direction in which light travels, the direction can be adjusted or controlled by means of the shape of the first surface 21. Thus, properly curving the first surface 21 to cause the light incident thereon to be totally reflected makes it possible to inhibit the generation of uneven brightness by the direct incident light.

What has been described above regarding the upper portion in the Y direction of the light distribution adjusting member 4 also applies to the lower portion in the Y direction of the light distribution adjusting member 4. Namely, the light distribution adjusting member 4 is shaped to be symmetrical about the X axis extending through the center of the light source substrate 2. The dimension in the Y direction of the light distribution adjusting member 4 is equal to or smaller than one tenth the dimension in the Y direction of the light output surface of the planar lighting device. It is, for example, 1 to 5 cm. Therefore, the light emitted from the light sources can be formed into planar light using the light distribution adjusting member 4 more economically than using a light guide plate as large in area as the light emitting surface of the planar lighting device.

Figure 11:
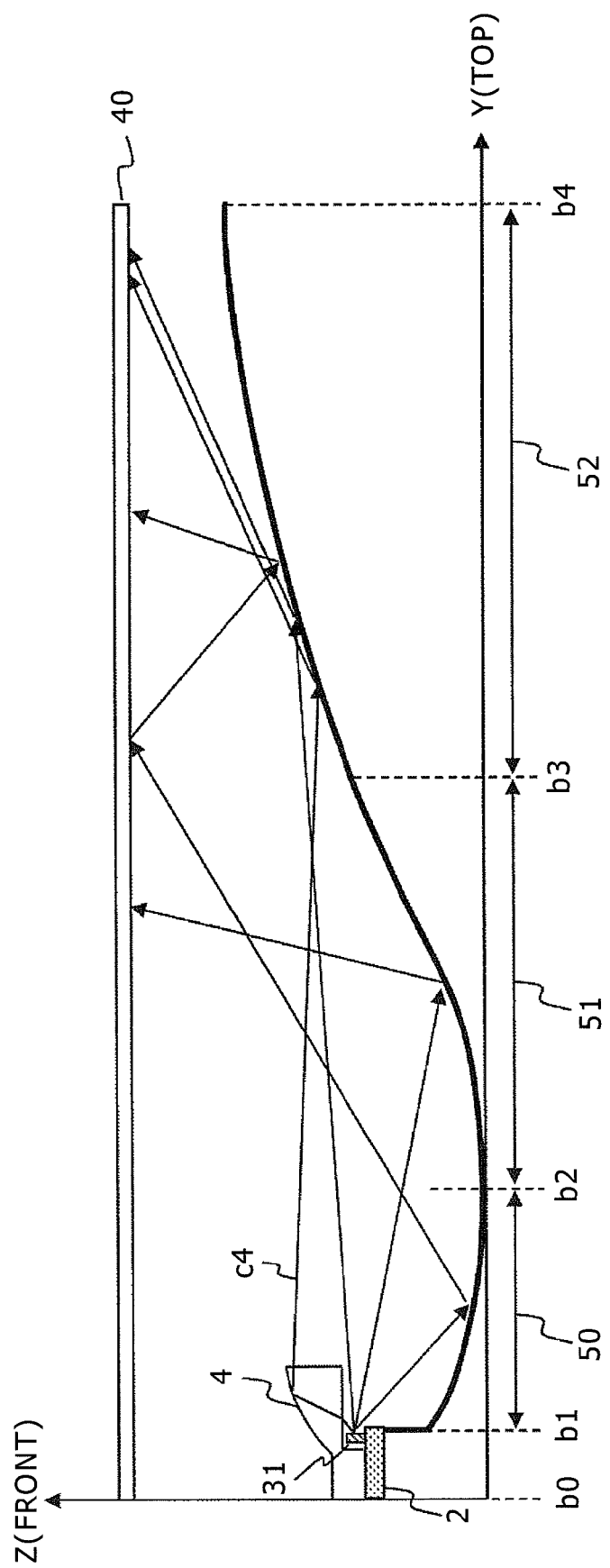
FIG. 11 is a schematic diagram showing light rays as seen on a Y-Z plane of a planar lighting device according to the first embodiment of the present invention.

FIG. 11 is a Y-Z plane view of the planar lighting device 100 including the reflection layer 1, light source substrate 2, first light source 31, light distribution adjusting member 4, and optical sheet 40. In FIG. 11, only an upper portion above the center in the Y direction of the planar lighting device 100 is shown. As shown in FIG. 11, the light source (the first light source 31 in the present example) emits light upward in the Y direction into the space between the reflection layer 1 of the base chassis 11 and the optical sheet 40. Some of the light enters inside the light distribution adjusting member 4 through the third surface 23 of the light distribution adjusting member 4 to be then totally reflected from the first surface 21 of the light distribution adjusting member 4. This inhibits the light having entered the light distribution adjusting member 4 from directly reaching the optical sheet 40. Thus, most of the light is caused, before reaching the optical sheet 40, to travel upward in the Y direction through the second surface 22 to be then reflected or diffused from the reflection layer 1. Most of the light not entering the light distribution adjusting member 4 after being emitted from the first light source 31 directly reaches the reflection layer 1 to be reflected or diffused therefrom as described above with reference to FIG. 10. The light reaching the optical sheet 40 after being reflected or diffused from the reflection layer 1 is reflected or diffused therefrom or is transmitted therethrough. This process is repeated during multiple reflections between the reflection layer 1 and the optical sheet 40. This makes it possible to realize a planar lighting device with a gentle spatial brightness gradient of illuminating light emitted from the light emitting surface of the planar lighting device.

As described above, according to the present embodiment, using the reflection layer 1 and light distribution adjusting member 4 having curved surfaces or being curvedly shaped makes it possible to suppress primary reflection at edge portions of the light source substrate 2 and inhibit the generation of brightness unevenness by light directly reaching the optical sheet 40. Also, the present embodiment is structured such that most of the light emitted from the first light source 3 is reflected or diffused from the reflection layer 1 before reaching the optical sheet 40. This makes it possible to realize, at a low cost, the planar lighting device 100 with a gentle brightness gradient, i.e. with reduced brightness unevenness, and an image display device including the planar lighting device 100.

Second Embodiment

Even though, for the first embodiment described above, the third surface 23 of the light distribution adjusting member 4 has been described as a transmitting surface, the third surface 23 of the light distribution adjusting member 4 may be a diffusing surface having a light diffusing function. When the third surface 23 is a diffusing surface, it is possible to increase the amount of downward light propagation to below the first light source 31 in the Y direction, i.e. to areas which cannot be directly reached by light emitted from the light emitting surface 6, while also causing the light reaching the first surface 21 to be totally reflected without directly reaching the optical sheet 40. In the following, the structure of the light distribution adjusting member 4 in which the third surface 23 thereof is a diffusing surface will be described as a second embodiment of the present invention with reference to FIGS. 12 and 13. In the following description, the elements of the second embodiment identical in structure and function to those of the first embodiment will be denoted by identical reference numerals and symbols as used in the first embodiment and detailed description of such elements will be omitted.

FIG. 12 is a Y-Z plane sectional view showing the structure of the light distribution adjusting member 4 according to the second embodiment of the present invention. In FIG. 12, only a light source (a first light source 31 in the present example) emitting light upward in the Y direction of the light source substrate 2 and an upper portion in the Y direction of the light distribution adjusting member 4 are shown.

The light distribution adjusting member 4 of the present embodiment has a first surface 21 which is a curved surface formed forward, in the Z direction, of the first light source 31 (i.e. on the optical sheet 40 side), a second surface 22 which is positioned above, in the Y direction, the light emitting surface 6 of the first light source 31 to be approximately in parallel with the light emitting surface 6, and a light-diffusing third surface 24 which is positioned forward, in the Z direction, of the light sources 3 (i.e. on the optical sheet 40 side) to be closer to the light sources 3 than the first surface 21 and which faces the top surface of the light source substrate 2 while being approximately perpendicular to the light emitting surface 6. The light distribution adjusting member 4 is made of, for example, transparent resin such as polycarbonate resin or acrylic resin. The first surface 21 is curved, as shown in FIG. 12, to be convex as seen from the front side in the Z direction (i.e. the optical sheet 40 side). The second surface 22 is connected to the first surface 21 and the third surface 24. As described above, the light distribution adjusting member 4 of the present embodiment is shaped to project beyond the light emitting surface 6 of the light source (the first light source 31 in the present example) in the direction of light emission, i.e. upward in the Y direction, and to cover a front portion in the Z direction (i.e. a portion on the optical sheet 40 side) of the first light source 31.

Each of the first surface 21 and second surface 22 is a mirror-finished transmitting surface. The third surface 24 is a diffusing surface as mentioned above. The type of the diffusing surface is not particularly defined as long as the surface has a light diffusing function. It may be, for example, a surface with a grained pattern printed thereon making the surface finely irregular or a surface physically shaped to be irregular.

A light ray c1 emitted from the light emitting surface 6 is diffusely refracted at the third surface 24 of the light distribution adjusting member 4 to then travel as light rays c2, c5, and c6. The light ray c2 is, as in the first embodiment, totally reflected at the first surface 21, then travels, as a light ray c3, to be then slightly refracted at the second surface 22 and further travels, as a light ray c4, into the space between the reflection layer 1 and the optical sheet 40. Of the light rays c5 and c6 diffused from the third surface 24, the light ray c5 reaches the first surface 21 at a small incidence angle, so that it is refracted at the first surface 21 and further travels as a light ray c7 into the space upward of the light distribution adjusting member 4 (toward the front side in the Z direction). The light ray c6 reaches the second surface 22 to be refracted there, and then further travels as a light ray c8, into the space between the reflection layer 1 and the optical sheet 40. The area that the light ray c7 heads for is downward, in the Y direction, of the light emitting surface 6 and cannot be directly irradiated with the light emitted from the light emitting surface 6.

With the third surface 24 being a diffusing surface and the first surface 21 curved to totally reflect the incident light as described above, the generation of brightness unevenness due to direct incident light can be inhibited and the amount of light propagated to areas which cannot be directly irradiated with the light emitted from the light emitting surface 6 can be increased.

Figure 13:
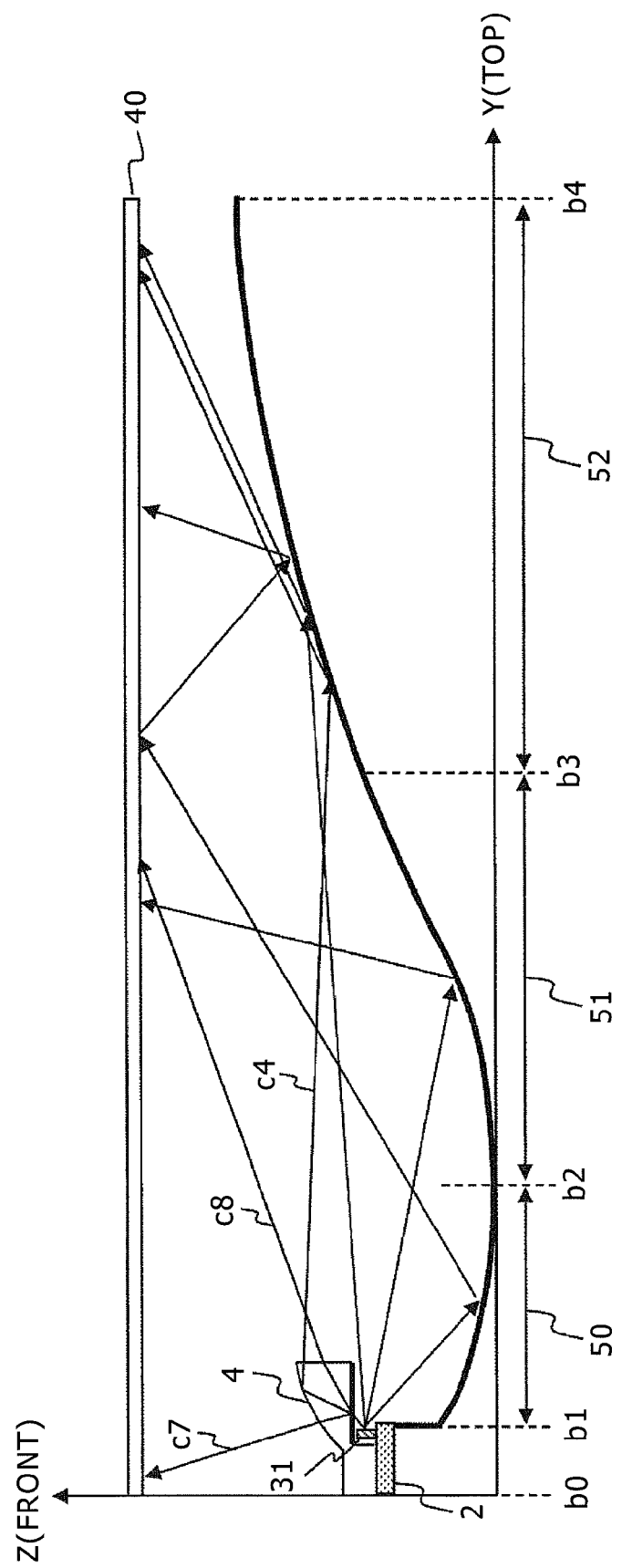
FIG. 13 is a schematic diagram showing light rays as seen on a Y-Z plane of a planar lighting device according to the second embodiment of the present invention.

FIG. 13 is a Y-Z plane view of the planar lighting device 100 including the reflection layer 1, light source substrate 2, first light source 3, light distribution adjusting member 4, and optical sheet 40 according to the second embodiment. In FIG. 13, only an upper portion above the center in the Y direction of the planar lighting device 100 is shown. As shown in FIG. 13, the light source (the first light source 31 in the present example) emits light upward in the Y direction into the space between the reflection layer 1 of the base chassis 11 and the optical sheet 40. Some of the light enters inside the light distribution adjusting member 4 through the third surface 23 that is a diffusing surface. Part of the light is then totally reflected from the first surface 21 of the light distribution adjusting member 4. This reduces the light directly reaching the optical sheet 40 and causes most of the light to be outputted upward in the Y direction through the second surface 22 and to be then reflected or diffused from the reflection layer 1 before reaching the optical sheet 40.

A light ray c7 diffused at the third surface 24 that is a diffusing surface travels downward in the Y direction of the first light source 31 to contribute to the brightness of an area between b0 and b1 around the center of the planar lighting device 100 which cannot be directly irradiated with the light emitted from the first light source 31. A light ray c8 also diffused at the third surface 24 reaches, without being reflected or diffused at the reflection layer 1, the optical sheet 40 as a direct incident ray. The light ray c8 directly reaching the optical sheet 40 as a result of diffusion at the third surface 24 is, however, adequately weak compared with the direct incident light that would occur if the light distribution adjusting member 4 was not provided, so that it does not generate a steep brightness gradient.

Most of the light not entering the light distribution adjusting member 4 after being emitted from the first light source 31 directly reaches the reflection layer 1 to be reflected or diffused therefrom as described above with reference to FIG. 10. The light reaching the optical sheet 40 after being reflected or diffused from the reflection layer 1 is reflected or diffused therefrom or is transmitted therethrough. This process is repeated during multiple reflections between the reflection layer 1 and the optical sheet 40. This makes it possible to realize a planar lighting device with a gentle spatial brightness gradient of illuminating light emitted from the light emitting surface of the planar lighting device.

Thus, according to the present embodiment, the generation of brightness unevenness due to direct incident light can be inhibited and the amount of light propagated to areas which cannot be directly irradiated with the light emitted from the light emitting surface 6 can be increased. This makes it possible to provide the planar lighting device 100 having a gentler brightness gradient, i.e. showing reduced brightness unevenness, and an image display device including the planar lighting device 100.

Third Embodiment

Even though, for the first and second embodiments, the first surface 21 of the light distribution adjusting member 4 has been described as a curved transmitting surface which totally reflects incident light, the first surface 21 may locally include a diffusing/shielding area. In such a case, too, it is possible to inhibit, by the total reflection of light at the first surface 21, light from directly reaching the optical sheet 40 while increasing, by the diffusing/shielding function the first surface 21 is locally provided with, the amount of light propagated to areas downward in the Y direction of the first light source 31, i.e. areas which cannot be directly irradiated with the light emitted from the light emitting surface 6, and an area near the first surface 21. In the following, the above structure of the light distribution adjusting member 4 will be described as a third embodiment of the present invention with reference to FIG. 14. In the following description, the elements of the third embodiment identical in structure and function to those of the first or second embodiment will be denoted by identical reference numerals and symbols as used in the first or second embodiment and detailed description of such elements will be omitted.

Figure 14:
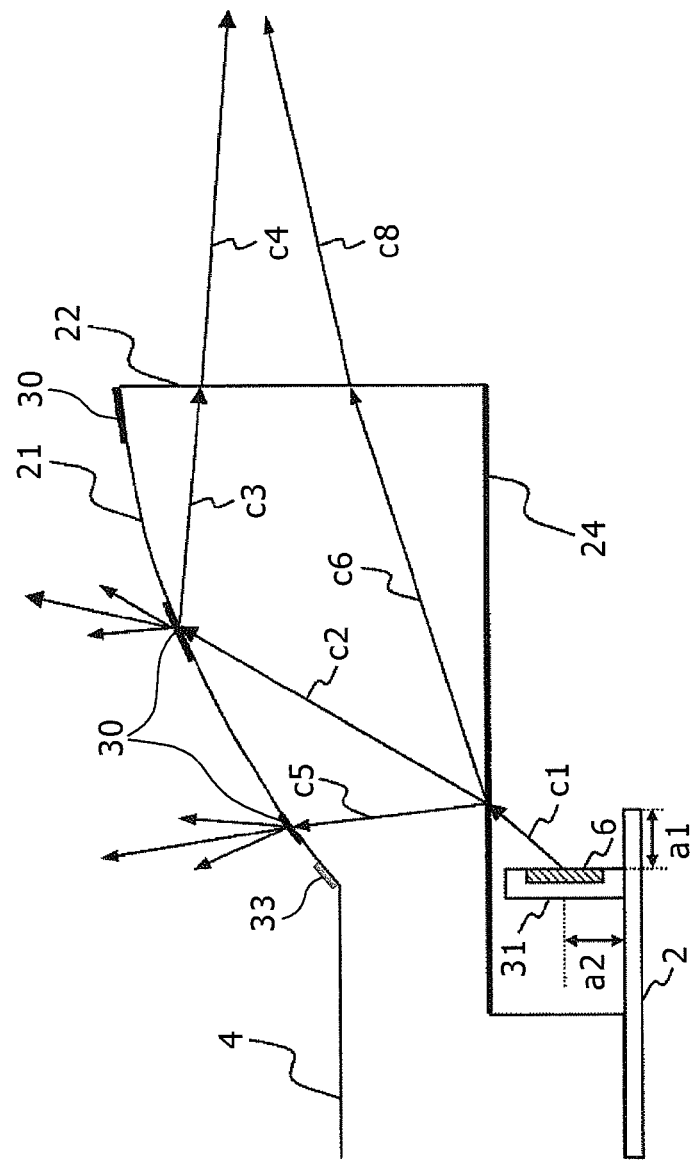
FIG. 14 is a schematic diagram for explaining a light distribution adjusting member according to a third embodiment of the present invention.

FIG. 14 is a Y-Z plane sectional view showing the structure of the light distribution adjusting member 4 according to the third embodiment of the present invention. In FIG. 14, only a light source (a first light source 31 in the present example) emitting light upward in the Y direction of the light source substrate 2 and an upper portion in the Y direction of the light distribution adjusting member 4 are shown.

The light distribution adjusting member 4 of the present embodiment has a first surface 21 which is a curved surface formed forward, in the Z direction, of the first light source 31 (i.e. on the optical sheet 40 side) and which includes a diffusing surface 30 and a light shielding surface 33, a second surface 22 which is positioned above, in the Y direction, the light emitting surface 6 of the first light source 31 to be approximately in parallel with the light emitting surface 6, and a light-diffusing third surface 24 which is positioned forward, in the Z direction, of the light sources 3 (i.e. on the optical sheet 40 side) to be closer to the light sources 3 than the first surface 21 and which faces the top surface of the light source substrate 2 while being approximately perpendicular to the light emitting surface 6. The light distribution adjusting member 4 is made of, for example, transparent resin such as polycarbonate resin or acrylic resin. The first surface 21 is curved, as shown in FIG. 14, to be convex as seen from the front side in the Z direction (i.e. the optical sheet 40 side). The second surface 22 is connected to the first surface 21 and the third surface 24. As described above, the light distribution adjusting member 4 of the present embodiment is shaped to project beyond the light emitting surface 6 of the light source (the first light source 31 in the present example) in the direction of light emission, i.e. upward in the Y direction, and to cover a front portion in the Z direction (i.e. a portion on the optical sheet 40 side) of the first light source 31.

Each of the first surface 21 and second surface 22 is a mirror-finished transmitting surface. The third surface 24 is a diffusing surface as mentioned above. As shown in FIG. 14, the first surface 21 locally includes a diffusing surface 30 and a light shielding surface 33. The type of the diffusing surface is not particularly defined as long as the surface has a light diffusing function. It may be, for example, a surface with a grained pattern printed thereon making the surface finely irregular or a surface physically shaped to be irregular. The light shielding surface is a surface with a transmission rate not exceeding 20%. It may be a surface with black ink or shielding paint printed thereon or physically covered with shielding material.

A light ray $c_1$ emitted from the light emitting surface 6 is diffusely refracted at the third surface 24 of the light distribution adjusting member 4 to then travel as light rays $c_2$, $c_5$, and $c_6$. Part of the light ray $c_2$ is totally reflected from the first surface 21 and part of the light ray $c_2$ is transmitted through the diffusing surface 30 to be diffused therefrom. The part totally reflected from the first surface 21 of the light ray $c_2$ reaches, as a light ray $c_3$, the second surface 22 to be slightly refracted there and further travels, as a light ray $c_4$, into the space between the reflection layer 1 and the optical sheet 40. The part having been diffusely transmitted through the diffusing surface 30 of the light ray $c_2$ further travels into the space upward of the light distribution adjusting member 4 (toward the front side in the Z direction). Of the light rays $c_5$ and $c_6$ diffused from the third surface 24, the light ray $c_5$ reaches the first surface 21 at a small incidence angle, so that it is, without being totally reflected, diffusely transmitted through the first surface 21 and further travels into the space upward of the light distribution adjusting member 4 (toward the front side in the Z direction). The light ray $c_6$ directly reaches the second surface 22 to be refracted there, and then further travels as a light ray $c_8$ into the space between the reflection layer 1 and the optical sheet 40. The area that the light ray $c_5$ diffused at the diffusing surface 30 heads for is downward, in the Y direction, of the light emitting surface 6 and cannot be directly irradiated with the light emitted from the light emitting surface 6. Of the light (not shown) reaching a light shielding surface 33, only a small amount passes through the light shielding surface 33 and the rest of the light is reflected from or is absorbed by the light shielding surface 33.

As described above, including the diffusing surface 30 and the light shielding surface 33 locally in the first surface 21 makes it possible to control the amount of light propagated to areas near the first surface 21 and also to increase the amount of light propagated to areas which cannot be directly irradiated with the light emitted from the light emitting surface 6. This makes it possible to inhibit brightness reduction in areas which cannot be directly irradiated with the light emitted from the light emitting surface 6. Even though, in the present embodiment, the third surface 24 of the light distribution adjusting member 4 is a diffusing surface, it may be a mirror-finished transmitting surface.

Thus, according to the present embodiment, the generation of brightness unevenness due to direct incident light can be inhibited and the amount of light propagated to areas which cannot be directly irradiated with the light emitted from the light emitting surface 6 can be increased. This makes it possible to provide a planar lighting device having a gentler brightness gradient, i.e. showing reduced brightness unevenness, and an image display device including the planar lighting device.

Fourth Embodiment

Even though, for the first to third embodiments, the second surface 22 of the light distribution adjusting member 4 has been described as a transmitting surface approximately parallel with the light emitting surface 6, the second surface (a second surface 25 in the present example) of the light distribution adjusting member 4 may be concavely shaped to allow the second surface 25 to have a concave lens function for spreading light. In such a case, too, it is possible to inhibit, by the total reflection of light at the first surface 21, light from directly reaching the optical sheet 40 while increasing the amount of light propagated to areas downward in the Y direction of the first light source 31, i.e. areas which cannot be directly irradiated with the light emitted from the light emitting surface 6. Also, with the second surface 25 that is a pseudo-light emitting surface of the light distribution adjusting member 4 provided with a concave lens function, the second surface 25 can function as a light emitting surface for irradiating a wider area. In the following, the above structure of the light distribution adjusting member 4 will be described as a fourth embodiment of the present invention with reference to FIG. 15. In the following description, the elements of the fourth embodiment identical in structure and function to those of the first to third embodiments will be denoted by identical reference numerals and symbols as used in the first to third embodiments and detailed description of such elements will be omitted.

Figure 15:
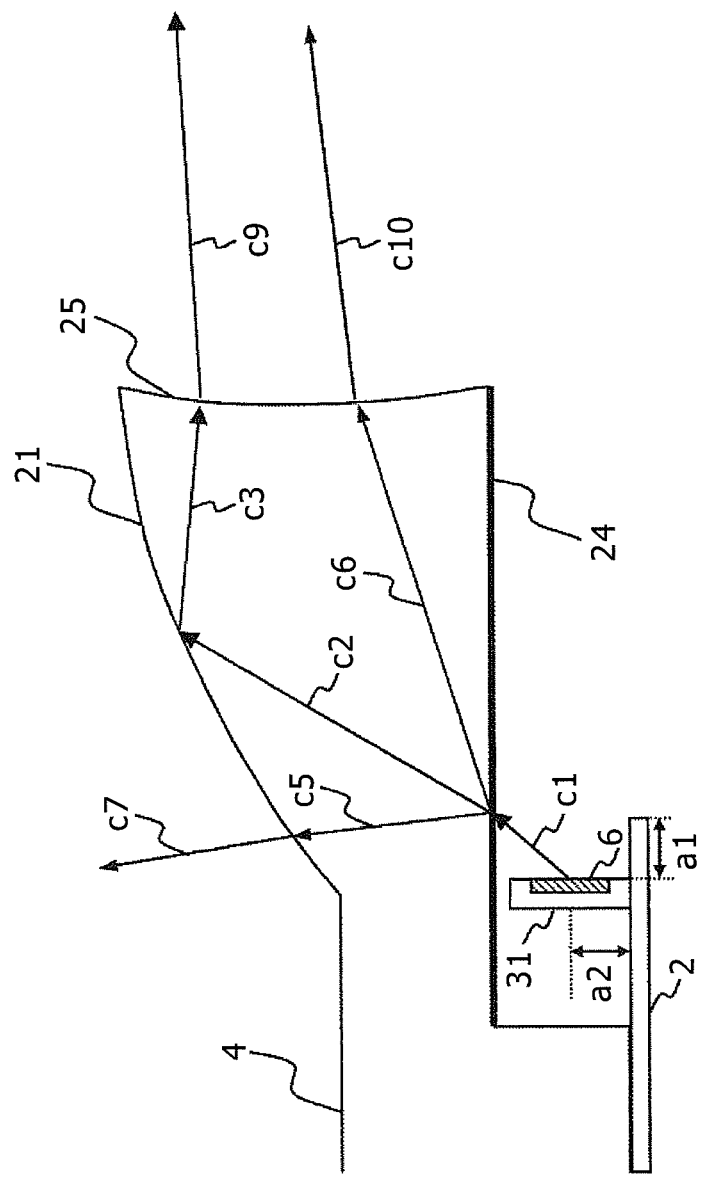
FIG. 15 is a schematic diagram for explaining a light distribution adjusting member according to a fourth embodiment of the present invention.

FIG. 15 is a Y-Z plane sectional view showing the structure of the light distribution adjusting member 4 according to the fourth embodiment of the present invention. In FIG. 14, only a light source (a first light source 31 in the present example) emitting light upward in the Y direction of the light source substrate 2 and an upper portion in the Y direction of the light distribution adjusting member 4 are shown.

The light distribution adjusting member 4 of the present embodiment has a first surface 21 which is a curved surface formed forward, in the Z direction, of the first light source 31 (i.e. on the optical sheet 40 side), a second surface 25 which is a curved surface formed above, in the Y direction, the light emitting surface 6 of the first light source 31, and a light-diffusing third surface 24 which is positioned forward, in the Z direction, of the light sources 3 (i.e. on the optical sheet 40 side) to be closer to the light sources 3 than the first surface 21 and which faces the top surface of the light source substrate 2 while being approximately perpendicular to the light emitting surface 6. The light distribution adjusting member 4 is made of, for example, transparent resin such as polycarbonate resin or acrylic resin. The first surface 21 is curved, as shown in FIG. 15, to be convex as seen from the front side in the Z direction (i.e. the optical sheet 40 side). The second surface 25 is connected to the first surface 21 and the third surface 24. Furthermore, the second surface 25 has a concave lens surface which is concave as seen from above in the Y direction. As described above, the light distribution adjusting member 4 of the present embodiment is shaped to project beyond the light emitting surface 6 of the light source (the first light source 31 in the present example) in the direction of light emission, i.e. upward in the Y direction, and to cover a front portion in the Z direction (i.e. a portion on the optical sheet 40 side) of the first light source 31. Each of the first surface 21 and second surface 25 is a mirror-finished transmitting surface. The third surface 24 is a diffusing surface as mentioned above. The type of the diffusing surface is not particularly defined as long as the surface has a light diffusing function. It may be, for example, a surface with a grained pattern printed thereon making the surface finely irregular or a surface physically shaped to be irregular.

A light ray c1 emitted from the light emitting surface 6 is diffusely refracted at the third surface 24 of the light distribution adjusting member 4 to then travel as light rays c2, c5, and c6. The light ray c2 is totally reflected from the first surface 21 and reaches, as a light ray c3, the second surface 25. The light ray c3 reaching the second surface 25 is greatly refracted at the second surface 25 having a concave lens function, then further travels, as a light ray c9, into the space between the reflection layer 1 and the optical sheet 40. Of the light rays c5 and c6 diffused at the third surface 24, the light ray c5 reaches the first surface 21 at a small incidence angle, so that it further travels into the space upward of the light distribution adjusting member 4 (toward the front side in the Z direction) after being refracted at the first surface 21. The light ray c6 directly reaches the second surface 25, is refracted by the second surface 25 having a concave lens function, and further travels, in a manner of spreading upward in the Y direction, as a light ray c10 into the space between the reflection layer 1 and the optical sheet 40. In this way, light usage efficiency can be improved and light can be efficiently distributed to the end portions in the Y direction of the planar lighting device to increase the brightness at the end portions. The area that the light ray c7 heads for is downward, in the Y direction, of the light emitting surface 6 and cannot be directly irradiated with the light emitted from the light emitting surface 6.

As described above, by making the third surface 24 a diffusing surface and the first surface 21 a curved surface which can totally reflect incident light, it is possible to inhibit the generation of brightness unevenness caused by light directly reaching the optical sheet 40 and increase the amount of light propagated to areas which cannot be directly irradiated with the light emitted from the light emitting surface 6. Also, curvedly shaping the second surface 25 so as to provide it with a concave lens function for spreading light allows the second surface 25 that is a pseudo-light emitting surface of the light distribution adjusting member 4 to function as a light emitting surface to irradiate a larger area. Even though, in the present embodiment, the third surface 24 of the light distribution adjusting member 4 is a diffusing surface, it may be a mirror-finished transmitting surface.

Thus, according to the present embodiment, the generation of brightness unevenness due to direct incident light can be inhibited and the amount of light propagated to areas which cannot be directly irradiated with the light emitted from the light emitting surface 6 can be increased. Also, the brightness at the end portions in the Y direction of the lighting device can be increased by means of the concave lens function of the second surface 25. The present embodiment, therefore, makes it possible to provide a planar lighting device in which light usage efficiency is high and which has a gentler brightness gradient, i.e. in which brightness unevenness is reduced, and an image display device including the planar lighting device.

Fifth Embodiment

Even though, for the first to fourth embodiments, the light distribution adjusting member 4 has been described as having the first surface 21, second surface 22 or 25, and third surface 24, the light distribution adjusting member 4 may additionally have a fourth surface 26 which is positioned right above, on the front side in the Z direction of, the first light source 31 inside the light distribution adjusting member 4 and which is shaped like an arc extending approximately about the first light source 31. The fourth surface 26 makes it possible to inhibit the generation of stray light caused by multiple reflections inside the light distribution adjusting member 4. In such a case, too, it is possible to inhibit, by the total reflection of light at the first surface 21, light from directly reaching the optical sheet 40 while increasing the amount of light propagated to areas downward in the Y direction of the first light source 31, i.e. areas which cannot be directly irradiated with the light emitted from the light emitting surface 6. In the following, the above structure of the light distribution adjusting member 4 will be described as a fifth embodiment of the present invention with reference to FIG. 16. In the following description, the elements of the fifth embodiment identical in structure and function to those of the first to fourth embodiments will be denoted by identical reference numerals and symbols as used in the first to fourth embodiments and detailed description of such elements will be omitted.

Figure 16:
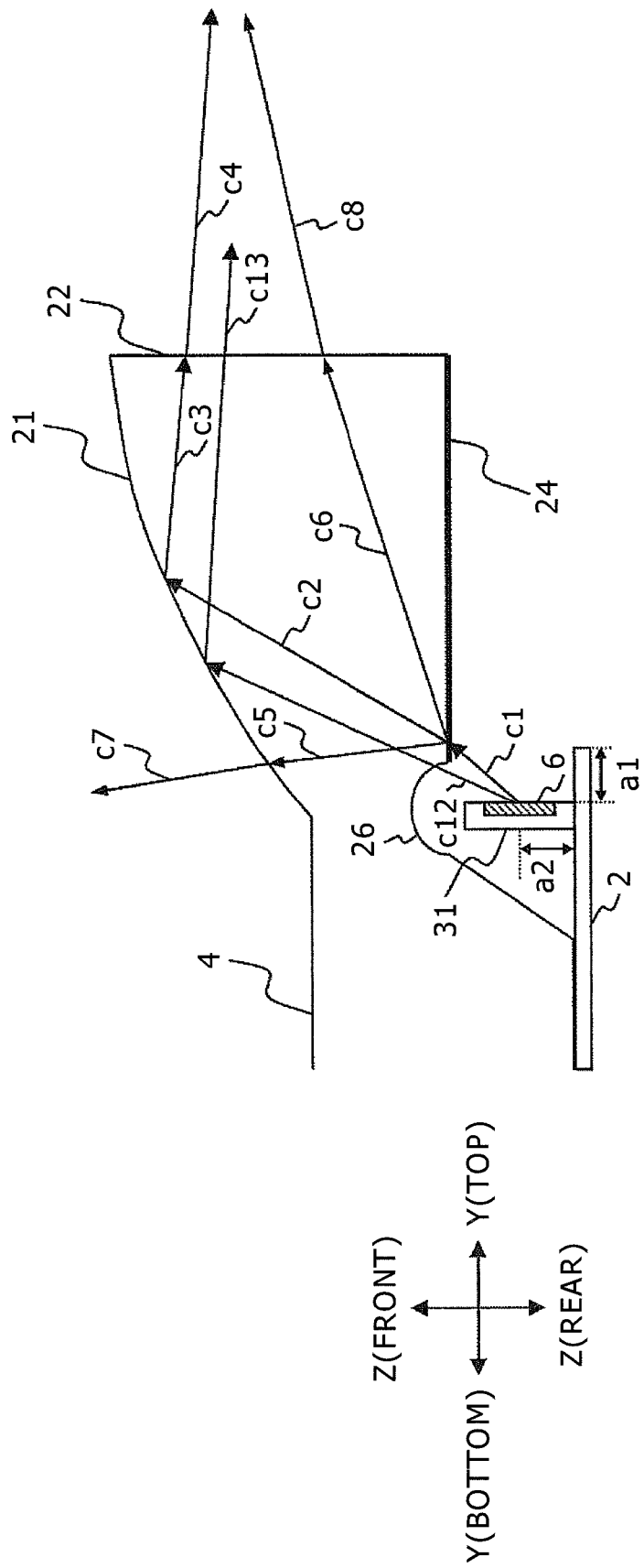
FIG. 16 is a schematic diagram for explaining a light distribution adjusting member according to a fifth embodiment of the present invention.

FIG. 16 is a Y-Z plane sectional view showing the structure of the light distribution adjusting member 4 according to the fifth embodiment of the present invention. In FIG. 17, only a light source (a first light source 31 in the present example) emitting light upward in the Y direction of the light source substrate 2 and an upper portion in the Y direction of the light distribution adjusting member 4 are shown.

The light distribution adjusting member 4 of the present embodiment has a first surface 21 which is a curved surface formed forward, in the Z direction, of the first light source 31 (i.e. on the optical sheet 40 side), a second surface 22 which is positioned above, in the Y direction, the light emitting surface 6 of the first light source 31 to be approximately in parallel with the light emitting surface 6, a light-diffusing third surface 24 which is positioned forward, in the Z direction, of the light sources 3 (i.e. on the optical sheet 40 side) to be closer to the light sources 3 than the first surface 21 and which faces the top surface of the light source substrate 2 while being approximately perpendicular to the light emitting surface 6, and a fourth surface 26 positioned to face a front portion in the Z direction (i.e. a portion on the optical sheet 40 side) of the first light source 31. In a sectional view taken on a plane passing through the center of the first light source 31 to be in parallel with the direction of light emission from the first light source 31 and to be perpendicular to the planar surface of the optical sheet 40 (i.e. in a sectional view taken on a plane passing through the center of the first light source 31 to be in parallel with a Y-Z plane), the fourth surface 26 is shaped like an arc which is concave as seen from the first light source 31 side and which extends over a front portion in the Z direction (i.e. a portion on the optical sheet 40 side) of the first light source 31. The light distribution adjusting member 4 is made of, for example, transparent resin such as polycarbonate resin or acrylic resin. The first surface 21 is curved, as shown in FIG. 16, to be convex as seen from the front side in the Z direction (i.e. the optical sheet 40 side). The second surface 22 is connected to the first surface 21 and the third surface 24. As described above, the light distribution adjusting member 4 of the present embodiment is shaped to project beyond the light emitting surface 6 of the light source (the first light source 31 in the present example) in the direction of light emission, i.e. upward in the Y direction, and to cover a front portion in the Z direction (i.e. a portion on the optical sheet 40 side) of the first light source 31.

Each of the first surface 21 and the second surface 22 is a mirror-finished transmitting surface. The third surface 24 is a diffusing surface as mentioned above. The fourth surface 26 may be either a transmitting surface or a diffusing surface. The type of the diffusing surface is not particularly defined as long as the surface has a light diffusing function. It may be, for example, a surface with a grained pattern printed thereon making the surface finely irregular or a surface physically shaped to be irregular.

Next, there will be described the effects of additionally providing the light distribution adjusting member 4 of the present embodiment with a fourth surface 26 having an arc-like section which is concave as seen from the first light source 31 side.

Light reflected from the reflection layer 1 and the optical sheet 40 enters the light distribution adjusting member 4 at various incident angles, so that, inside the light distribution adjusting member 4, light travels in various directions. The fourth surface 26 formed substantially right above the first light source 31 has an arc-like section which is concave as seen from the first light source 31 side, so that it has a concave lens function. Therefore, inside the light distribution adjusting member 4 where light travels in various directions, the fourth surface 26 is effective in reducing the amount of light heading for the first light source 31. With the first light source 31 being an LED, light incident on the first light source 31 is absorbed by the package of the LED to lower light usage efficiency. When, as in the present embodiment, the light heading for the first light source 31 inside the light distribution adjusting member 4 is reduced, the light absorbed by the first light source 31 is also reduced to improve light usage efficiency. In this way, the amount of light heading for the first light source 31 to be absorbed by the first light source 3 inside the light distribution adjusting member 4 can be reduced in cases where the materials making up the light source substrate 2 are lower in optical absorptance than the materials making up the first light source 3, Thus, according to the present embodiment, the fourth surface 26 having an arc-like section which is concave as seen from the first light source 31 side is provided substantially right above the first light source 31, so that the light usage efficiency in the planar lighting device can be improved.

With the fourth surface 26 shaped like an arc, the refraction angle at the fourth surface 26 of a light ray c12 directly incident on the fourth surface 26 after being emitted from the first light source 31 can be made small. This allows the light ray c12 to reach the first surface 21 maintaining the angle at which it was emitted from the light emitting surface 6, so that the light ray c12 is totally reflected from the first surface 21 to then travel, after being slightly refracted at the second surface 22, upward in the Y direction as a light ray c13 heading toward an end portion in the Y direction of the light output surface of the planar lighting device. According to the present embodiment, the third surface 24 of the light distribution adjusting member 4 is a diffusing surface, but it may be a mirror-finished transmitting surface.

Thus, according to the present embodiment, light usage efficiency can be improved, the generation of brightness unevenness due to direct incident light can be inhibited, and the amount of light propagated to areas which cannot be directly irradiated with the light emitted from the light emitting surface 6 can be increased. Also, the fourth surface 46 serves to improve light usage efficiency by reducing light absorption by the light source. The present embodiment, therefore, makes it possible to provide a planar lighting device in which light usage efficiency is high and which has a gentler brightness gradient, i.e. in which brightness unevenness is reduced, and an image display device including the planar lighting device.

Sixth Embodiment

Even though, for the foregoing embodiments, the planar lighting device 100 has been described as having a single light source substrate 2 provided on a Y-Z plane, the planar lighting device 100 may have two or more light source substrates 2. Providing two or more light source substrates 2 requires the reflection layer 1 to be shaped differently from its shape for the first to fifth embodiments. In the following, an embodiment in which two light source substrates 2 are provided at two levels in the Y direction will be described with reference to FIG. 17 as a sixth embodiment of the present invention.

In the sixth embodiment, two light source substrates 2, referred to, in the present example, as a first light source substrate 28 and a second light source substrate 29, are arranged at two levels in the Y direction on the base chassis 11 as shown in FIG. 17. Namely, the base chassis 11 has two flat parts on which the first light source substrate 28 and the second light source substrate 29 are mounted, respectively.

Also, the base chassis 11 has a peak P formed between the two flat parts thereof (i.e. between the first light source substrate 28 and the second light source substrate 29). The peak P is positioned to correspond to point F approximately at the center in the Y direction of the light output surface of the planar lighting device 100 and projects toward the optical sheet 40. The reflection layer 1 has a first light condensing curved portion C1 and a second light condensing curved portion C2 formed to be above and below the peak P in the Y direction, respectively. The first light condensing curved portion C1 of the reflection layer 1 is a part of an ellipsoidal shape and has two focal points. Of the two focal points, one is positioned at the second light source 32 on the light source substrate 28 and the other is at the point F approximately at the center in the Y direction of the light output surface of the planar lighting device 100. The second light condensing curved portion C2 of the reflection layer 1 is also a part of an ellipsoidal shape and has two focal points. Of the two focal points, one is at the first light source 31 on the light source substrate 29 and the other is at the point F approximately at the center in the Y direction of the light output surface of the planar lighting device 100. A curved portion C0 positioned above the first light source substrate 28 in the Y direction and a curved portion C0 positioned below the second light source substrate 29 in the Y direction each have the apex b2 and the inflection point b3, described in the foregoing with reference to FIG. 9, whose optical effects and characteristics are the same as described in the foregoing with reference to FIG. 9.

According to the present embodiment, the reflection layer 1 has the first light condensing curved portion C1 and the second light condensing curved portion C2 each having two focal points one of which is at the light source on a light source substrate 2 and the other of which is at the point F approximate at the center in the Y direction of the light output surface of the planar lighting device 100. This makes it possible to condense the light reflected from the reflection layer 1 toward an approximately central portion in the Y direction of the light output surface of the planar lighting device 100. The ellipsoidal shapes parts of which make up the first light condensing curved portion C1 and the second light condensing curved portion C2, respectively, each have an optical characteristic to cause light outputted from one of the two focal points to be condensed at the other focal point. Therefore, even in cases where the distance e1 between the first light source substrate 28 and the second light source substrate 29 is large, light can be appropriately supplied to around the center of the planar lighting device 100. Also, even in cases where the distance e1 is made large in order to increase the brightness at both ends in the Y direction of the light output surface of the planar lighting device, the brightness around the center of the planar lighting device 100 can be maintained.

Thus, according to the present embodiment, it is possible to increase brightness, to inhibit the generation of brightness unevenness due to direct incident light, and to increase the amount of light propagated to areas which cannot be directly irradiated with the light emitted from the light emitting surface 6. This makes it possible to provide a planar lighting device which has a gentler brightness gradient, i.e. in which brightness unevenness is reduced, and an image display device including the planar lighting device. Also, the present embodiment is advantageous in making up a planar lighting device having a light output surface larger in area as compared with the first to fifth embodiments and also in reducing brightness unevenness in a planar light device having such a large light output area.

Furthermore, though not shown in FIG. 17, it is possible to thin out, depending on the application of the planar lighting device, the LEDs mounted on each light source substrate, i.e. to decrease the number of LEDs (while also reducing the light source substrate area) and to, thereby, achieve a cost reduction while securing the amount of light required for the application.

The above embodiments each concern a planar lighting device applied, as a backlight, to an image display device, but the application of the planar lighting device is not limited to a backlight for an image display device. The planar lighting devices according to the above embodiments of the present invention can also be used for, for example, room illumination, illumination in an elevator car, illumination in a vehicle, or signboard illumination. Furthermore, the above embodiments may be arbitrarily combined to make up a planar lighting device.

What is claimed is:

1. A lighting device comprising:
a curvedly shaped base chassis having a reflection layer provided on an inner surface thereof;
an optical sheet which is disposed to face the reflection layer of the base chassis and outputs illuminating light of the lighting device;
a light source group which is disposed in a space between the base chassis and the optical sheet and includes a plurality of first light sources emitting light in a first direction and a plurality of second light sources emitting light in a second direction opposite to the first direction;
a light source substrate on which the light source group is mounted and which is mounted on the base chassis; and
a light distribution adjusting member which is disposed to cover an optical sheet side of the light source group and which directs light from the light source group into predetermined directions,
wherein the first and second directions in which light is emitted from the light source group are, in a space between the base chassis and the optical sheet, in parallel with a light output surface of the optical sheet, the plurality of the first light sources are arranged in a direction perpendicular to the first direction, and the plurality of the second light sources are arranged in a direction perpendicular to the second direction, and
wherein the reflection layer on the inner surface of the base chassis is curved such that a portion thereof on each of the first-direction side and the second-direction side relative to where the light source substrate is mounted is curved to concavely face the optical sheet.

2. The lighting device according to claim 1, wherein the first and second light sources are each an LED and the light source substrate is mounted on a flat part formed in a central portion of the base chassis.

3. The lighting device according to claim 1, wherein the reflection layer is one of a reflection sheet provided on the inner surface of the base chassis, white paint applied to the inner surface of the base chassis, and the inner surface having been mirror-finished of the base chassis.

4. The lighting device according to claim 1, wherein the light distribution adjusting member includes transparent resin and is shaped to cover the optical sheet side of the light source group and to project beyond a light emitting surface of each light source included in the light source group in the direction of light emission from the each light source.

5. The lighting device according to claim 2,
wherein the light distribution adjusting member has a first surface which is a curved surface positioned on the optical sheet side of the light source group, a second surface which is positioned to be away from the light emitting surface of each light source included in the light source group in the direction of light emission from the each light source and to be approximately in parallel with the light emitting surface of the each light source, and a third surface which is positioned on the optical sheet side of the light source group to be closer to the light source group than the first surface and which faces a top surface of the light source substrate while being approximately perpendicular to the light emitting surface of the each light source, wherein the first surface is curved to be convex toward the optical sheet side and the second surface is connected to the first surface and the third surface.

6. The lighting device according to claim 5, wherein the first to third surfaces of the light distribution adjusting member are each a mirror-finished transmitting surface.

7. The lighting device according to claim 5, wherein the first and second surfaces of the light distribution adjusting member are each a mirror-finished transmitting surface and the third surface of the light distribution adjusting member is a diffusing surface.

8. The lighting device according to claim 5, wherein the first surface of the light distribution adjusting member locally includes a diffusing surface and a light shielding surface.

9. The lighting device according to claim 5, wherein the second surface of the light distribution adjusting member includes a concave surface, causing the second surface to have a concave lens function.

10. The lighting device according to claim 5, wherein the light distribution adjusting member further has a fourth surface facing a top portion of the each light source, the fourth surface being shaped, as seen on a sectional plane passing through the center of the each light source to be in parallel with the direction of light emission from the each light source and to be perpendicular to a surface of the optical sheet, like an arc which is concave away from the each light source, and which extends over the top portion of the each light source.

11. The lighting device according to claim 1, wherein an angle formed between a straight line connecting a center of the light emitting surface of the each light source included in the light source group and an end portion, in the direction of light emission from the each light source, of a surface where the each light source is mounted of the light source substrate and a straight line passing, perpendicularly to the light emitting surface of the each light source, through the center of the light emitting surface of the each light source is 30 degrees or larger.

12. The lighting device according to claim 1, wherein, of the light sources included in the light source group mounted on the light source substrate, light sources disposed in an area on the light source substrate corresponding to a central portion of a light output surface of the lighting device are mutually closer than light sources disposed in an area on the light source substrate corresponding to a close-to-end portion of the light output surface of the lighting device.

13. The lighting device according to claim 12, wherein the ratio between a maximum distance between adjacent light sources in the light source group and a minimum distance between adjacent light sources in the light source group is 0.6 or larger.

14. The lighting device according to claim 1, wherein the curved reflection layer has an apex in a portion thereof between, on each of the first-direction side and the second-direction side relative to where the light source substrate is mounted, the light source group and an end portion in the first or second direction of the lighting device, the apex being closer to the light source group than to the end portion, being closer to a rear side of the lighting device than the light source substrate is, and being concave away from the light output surface of the lighting device, and an inflection point between the apex and the end portion, the inflection point being where the gradient change rate of curve of the reflection layer is zero.

15. The lighting device according to claim 1, wherein the first light sources and the second light sources are mounted on the light source substrate not to mutually overlap as seen in a direction parallel with the first or second direction.

16. The lighting device according to claim 1, wherein the first light sources and the second light sources are mounted on the light source substrate such that the first light sources and the second light sources mutually overlap as seen in a direction parallel with the first or second direction.

17. The lighting device according to claim 1, wherein the light distribution adjusting member is screwed or bonded to the surface where the light source group is mounted of the light source substrate.

18. The lighting device according to claim 1, wherein the light source substrate is divided into two or more parts arranged along a direction in which the first light sources and the second light sources are arranged, respectively.

19. The lighting device according to claim 1, wherein the light source substrate includes a first light source substrate and a second light source substrate arranged to be at different positions in a direction parallel with the first or second direction.

20. The lighting device according to claim 19,
wherein the reflection layer has a peak positioned between the first light source substrate and the second light source substrate to correspond to a center, in a direction parallel with the first or second direction, of the light output surface of the lighting device, the peak projecting toward the optical sheet, and
wherein the reflection layer further has a first light condensing curved portion and a second light condensing curved portion formed, relative to the peak, on the first-direction side and on the second-direction side, respectively, the first light condensing curved portion being a part of an ellipsoidal shape and having two focal points with one positioned at the second light sources mounted on the first light source substrate and with the other positioned at the center of the light output surface of the lighting device, the second light condensing curved portion being a part of an ellipsoidal shape and having two focal points with one positioned at the first light sources mounted on the second light source substrate and with the other positioned at the center of the light output surface of the lighting device.

21. An image display device comprising the lighting device according to claim 1 as a backlight for illuminating a liquid crystal panel, the lighting device having a circuit substrate provided on a rear side of the curvedly shaped base chassis.

* * * * *